US012810093B2

(12) United States Patent
Chen et al.

(10) Patent No.: US 12,810,093 B2
(45) Date of Patent: Nov. 24, 2026

(54) SYSTEMS AND METHODS FOR HIGH-SPEED, HIGH-ACCURACY SYMBOL PROCESSING

(71) Applicant: Cognex Corporation, Natick, MA (US)

(72) Inventors: Mo Chen, Needham, MA (US); Lei Wang, Wayland, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 19/258,296

(22) Filed: Jul. 2, 2025

(65) Prior Publication Data

US 2026/0010746 A1 Jan. 8, 2026

Related U.S. Application Data

(60) Provisional application No. 63/667,644, filed on Jul. 3, 2024.

(51) Int. Cl.
*G06K 7/14* (2006.01)

(52) U.S. Cl.
CPC ......... *G06K 7/1443* (2013.01); *G06K 7/1413* (2013.01); *G06K 7/1417* (2013.01)

(58) Field of Classification Search
CPC ... G06K 7/1443; G06K 7/1413; G06K 7/1417
See application file for complete search history.

(56) References Cited

U.S. PATENT DOCUMENTS 11,875,259 B1 * 1/2024 Li ........................ G06K 7/1413
2022/0284384 A1 9/2022 Chaubard

OTHER PUBLICATIONS

Yoda, et al. "Learning Moderately Input-Sensitive Functions: A Case Study in QR Code Decoding", Jun. 25, 2025, https://doi.org/10.48550/arXiv.2506.20305 (Year: 2025).*
International Search Report and Written Opinion mailed Sep. 22, 2025 for International Application No. PCT/US2025/036275.
[No Author Listed] ZBar. Github. https://github.com/ZBar/ZBar. last accessed Oct. 7, 2025. 2 pages.
[No Author Listed] zxing. Github. https://github.com/zxing/zxing. last accessed Oct. 7, 2025. 3 pages.
Blanger et al., An evaluation of deep learning techniques for QR code detection. 2019 IEEE International Conference on Image Processing (ICIP), Taipei, Taiwan, Sep. 22, 2019 (pp. 1625-1629).

(Continued)

*Primary Examiner* — Matthew Mikels
(74) *Attorney, Agent, or Firm* — Wolf, Greenfield & Sacks, P.C.

(57) ABSTRACT

The techniques described herein relate to systems and methods for processing symbols of various types with high speed and high accuracy. The techniques can include accessing an image of a symbol comprising embedded information, inputting the image of the symbol into a deep learning module, and generating, with the deep learning module, predicted embedded information based on the image of the symbol. The predicted embedded information can include codewords, which correspond to the embedded information. The codewords can be further processed for generating the embedded information. Such techniques can enable fast and accurate processing of symbols of various types.

20 Claims, 18 Drawing Sheets

(56) References Cited

OTHER PUBLICATIONS

Bodnar et al., Efficient visual code localization with neural networks. Pattern Analysis and Applications. Feb. 2018;21(1):249-60.
Brylka et al., Camera based barcode localization and decoding in real-world applications. 2020 International Conference on Omni-layer Intelligent Systems (COINS). Aug. 31, 2020. 8 pages.
Choromanski et al., Rethinking attention with performers. arXiv Nov. 19, 2022. https://arxiv.org/abs/2009.14794. 38 pages.
Chou et al., QR code detection using convolutional neural networks. 2015 International conference on advanced robotics and intelligent systems (ARIS). May 29, 2015. 5 pages.
Dosovitskiy et al., An image is worth 16x16 words: Transformers for image recognition at scale. arXiv Jun. 3, 2021. https://arxiv.org/abs/2010.11929. 22 pages.
Dubska et al., Real-time precise detection of regular grids and matrix codes. Journal of Real-Time Image Processing. Jan. 2016;11(1):193-200.
Edula et al., A novel framework for QR Code detection and decoding from obscure images using yolo object detection and Real-ESRGAN image enhancement technique. 2023 14th International Conference on Computing Communication and Networking Technologies (ICCCNT). Jul. 6, 2023. 6 pages.
Hansen et al., Real-time barcode detection and classification using deep learning. In International Joint Conference on Computational Intelligence. 2017 (pp. 321-327). SciTePress.
Jia et al., Tiny-BDN: An efficient and compact barcode detection network. IEEE Journal of Selected Topics in Signal Processing. Feb. 27, 2020;14(4):688-99.
Kalinov et al., Warevision: CNN barcode detection-based uav trajectory optimization for autonomous warehouse stocktaking. IEEE Robotics and Automation Letters. Jul. 21, 2020;5(4):6647-53.
Katharopoulos et al., Transformers are rnns: Fast autoregressive transformers with linear attention. arXiv Aug. 31, 2020. https://arxiv.org/pdf/2006.16236. 17 pages.
Katuk et al., A review of the current trends and future directions of camera barcode reading. Journal of Theoretical and Applied Information Technology. 2019;97(8):2268-88.
Khan et al., Transformers in vision: A survey. ACM computing surveys (CSUR). Sep. 14, 2022;54(10s):1-41.
Kitaev et al., Reformer: The efficient transformer. arXiv Feb. 18, 2020 https://arxiv.org/pdf/2001.04451. 12 pages.
Li et al., An efficient method for DPM code localization based on depthwise separable convolution. IEEE Access. Mar. 18, 2019;7:42014-23.
Li et al., Using deep ConvNet for robust 1D barcode detection. InInternational Conference on Intelligent and Interactive Systems and Applications. Jun. 17, 2017 (pp. 261-267). Cham: Springer International Publishing.
Mahee et al., A study on image processing to facilitate business system by multiple barcode detection. B.Sc. thesis, Dept. Comp. Sci. Eng. Ahsanullah Univ. Sci. Tech., Dhaka, Bangladesh, Jun. 2019. 66 pages.
Pu et al., Quick response barcode deblurring via doubly convolutional neural network. Multimedia Tools and Applications. Jan. 2019;78(1):897-912.
Ren et al., Barcode detection and decoding method based on deep learning. 2019 2nd International Conference on Information Systems and Computer Aided Education (ICISCAE) Sep. 28, 2019 (pp. 393-396).
Soros et al., Blur-resistant joint 1D and 2D barcode localization for smartphones. In Proceedings of the 12th International Conference on Mobile and Ubiquitous Multimedia. Dec. 2, 2013. 8 pages.
Tay et al., Efficient Transformers: A Survey. arXiv Mar. 14, 2022. https://arxiv.org/abs/2009.06732. 39 pages.
Tian et al., BAN, a barcode accurate detection network. 2018 IEEE Visual Communications and Image Processing (VCIP). Taichung, Taiwan, Dec. 9, 2018. 5 pages.
Tolstikhin et al., MLP-mixer: An all-mlp architecture for vision. arXiv Jun. 11, 2021. https://arxiv.org/abs/2105.01601. 22 pages.
Touvron et al., Training data-efficient image transformers & distillation through attention. arXiv Jan. 15, 2021. https://www.arxiv.org/abs/2012.12877. 22 pages.
Vaswani et al., Attention is all you need. 31st Conference on Neural Information Processing Systems (NIPS 2017). arXiv e Aug. 2, 2023. https://arxiv.org/abs/1706.03762. 15 pages.
Ventsov et al., Localization of barcodes using artificial neural network. In2018 IEEE East-West Design & Test Symposium (EWDTS). Sep. 14, 2018. 6 pages.
Wudhikarn et al., Deep learning in barcode recognition: A systematic literature review. IEEE Access. Jan. 13, 2022;10:8049-72.
Xiao et al., 1D barcode detection via integrated deep-learning and geometric approach. Applied Sciences. Aug. 9, 2019;9(16):3268.
Yuan et al., MU R-CNN: A two-dimensional code instance segmentation network based on deep learning. Future Internet. Sep. 13, 2019;11(9):197.
Zamberletti et al., Neural Image Restoration for Decoding 1-D Barcodes using Common Camera Phones. In VISAPP (1) May 2010 (pp. 5-11).
Zamberletti et al., Robust angle invariant 1d barcode detection. 2013 2nd IAPR Asian Conference on Pattern Recognition. Nov. 5, 2013 (pp. 160-164).
Zhang et al., Detection and identification method of medical label barcode based on deep learning. In2018 Eighth International Conference on Image Processing Theory, Tools and Applications (IPTA). Nov. 7, 2018. 6 pages.
Zhang et al., Fast barcode detection method based on Thin YOLOv4. International Conference on Cognitive Systems and Signal Processing (ICCSIP). Singapore: Springer Singapore. Dec. 25, 2020 (pp. 41-55).
Zhang et al., Fine detection and classification of multi-class barcode in complex environments. In2019 IEEE International Conference on Multimedia & Expo Workshops (ICMEW). Jul. 8, 2019 (pp. 306-311).
Zhao et al., Deep dual pyramid network for barcode segmentation using barcode-30k database. arXiv Jul. 31, 2018. https://arxiv.org/abs/1807.11886. 13 pages.
Zharkov et al., New benchmarks for barcode detection using both synthetic and real data. InInternational workshop on document analysis systems. Jul. 26, 2020 (pp. 481-493).
Zharkov et al., Universal barcode detector via semantic segmentation. arXive Jun. 17, 2019. https://arxiv.org/abs/1906.06281. 7 pages.

* cited by examiner

[356, 183, 368, 187, 363, 136, 336, 136, 336, 190, 503, ..., 39, 471, 343]

[169, 171, 167, 170, 165, 167, 159, 206, ..., 223, 31, 47]

[1, 0, 1, 0, 1, 0, 1, 0, 1, 0, 1, 0, ..., 1, 1, 1, 1, 1]

SYSTEMS AND METHODS FOR HIGH-SPEED, HIGH-ACCURACY SYMBOL PROCESSING

RELATED APPLICATION

This application claims priority under 35 U.S.C. § 119 (e) to U.S. Provisional Application Ser. No. 63/667,644, titled "SYSTEMS AND METHODS FOR HIGH-SPEED, HIGH-ACCURACY SYMBOL PROCESSING," filed on Jul. 3, 2024, which is herein incorporated by reference in its entirety.

FIELD

The techniques described herein relate generally to imaging systems, including machine vision systems that are configured to identify symbols for objects.

BACKGROUND

Machine vision systems are generally configured to capture images and to analyze the images. For example, machine vision systems can be configured to capture images of objects and to analyze the images to identify the objects. As another example, machine vision systems can be configured to capture images of symbols and to analyze the images to decode the symbols. Accordingly, machine vision systems generally include one or more devices for image acquisition and image processing.

SUMMARY

Aspects of the present disclosure relate to systems and methods for processing symbols of various types with high speed and high accuracy.

Some embodiments relate to a method for processing symbols. The method may comprise accessing an image of a symbol comprising embedded information; inputting the image of the symbol into a deep learning module; and generating, with the deep learning module, predicted embedded information based on the image of the symbol.

Optionally, the method comprises generating the embedded information based on the predicted embedded information.

Optionally, generating the embedded information comprises determining errors in the predicted embedded information.

Optionally, generating the embedded information comprises correcting any determined errors in the predicted embedded information.

Optionally, the predicted embedded information comprises a plurality of codewords or intermediate digital representations of the plurality of codewords.

Optionally, the intermediate digital representations of the plurality of codewords comprise a binary module value sequence or byte sequence.

Optionally, generating the embedded information comprises determining errors in the plurality of codewords.

Optionally, generating the embedded information comprises correcting any determined errors in the plurality of codewords.

Optionally, the embedded information comprises data and/or an image.

Optionally, the symbol is a data matrix, a QR code, an Aztec code, or a linear barcode.

Optionally, the method comprises generating a candidate barcode region in the image of the symbol; and cropping the candidate barcode region from the image of the symbol.

Optionally, generating, with the deep learning module, the predicted embedded information comprises determining whether the candidate barcode region is a barcode region or a non-barcode region; and if it is determined that the candidate barcode region is a barcode region, determining a type and/or symbology of a barcode in the barcode region.

Optionally, generating, with the deep learning module, the predicted embedded information comprises dividing the cropped image into a plurality of patches; and extracting the predicted embedded information from the plurality of patches.

Optionally, the predicted embedded information comprises a plurality of feature vectors.

Optionally, each of the plurality of feature vectors corresponds to a codeword or an intermediate digital representation of a codeword.

Optionally, generating, with the deep learning module, the predicted embedded information comprises converting each of the plurality of patches into a one-dimensional (1D) vector, and adding position information to the converted 1D vectors; and extracting the predicted embedded information is based on the converted 1D vectors and added position information.

Optionally, generating, with the deep learning module, the predicted embedded information comprises adding a 1D vector to the converted 1D vectors; and generating a vector indicating a start of the predicted embedded information based on the added 1D vector.

Optionally, generating, with the deep learning module, the predicted embedded information comprises determining, with a first multi-head self-attention layer (MSA), relationships between the converted 1D vectors.

Optionally, generating, with the deep learning module, the predicted embedded information comprises extracting, with a first multilayer perceptron (MLP), a first plurality of feature vectors based on the relationships between the converted 1D vectors.

Optionally, generating, with the deep learning module, the predicted embedded information comprises extracting, with a first multilayer perceptron (MLP), a first plurality of feature vectors based on the converted 1D vectors.

Optionally, generating, with the deep learning module, the predicted embedded information comprises determining, with a second multi-head self-attention layer (MSA), relationships between the converted 1D vectors based on the relationships between the converted 1D vectors determined by the first MSA.

Optionally, generating, with the deep learning module, the predicted embedded information comprises extracting, with a second multilayer perceptron (MLP), a second plurality of feature vectors based on the first plurality of feature vectors.

Optionally, generating, with the deep learning module, the predicted embedded information comprises determining, with a second multi-head self-attention layer (MSA), relationships between the first plurality of feature vectors.

Optionally, generating, with the deep learning module, the predicted embedded information comprises extracting, with a second multilayer perceptron (MLP), a second plurality of feature vectors based on the relationships between the first plurality of feature vectors.

Optionally, the deep learning module is trained with a plurality of synthesized images so as to reduce image-specific inductive bias.

Optionally, the deep learning module comprises a plurality of transformer blocks.

Some embodiments relate to a system comprising at least one processor configured to perform one or more operations described herein.

Some embodiments relate to a non-transitory computer readable medium comprising program instructions that, when executed, cause at least one processor to perform one or more operations described herein.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF THE DRAWINGS

The accompanying drawings may not be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1B:
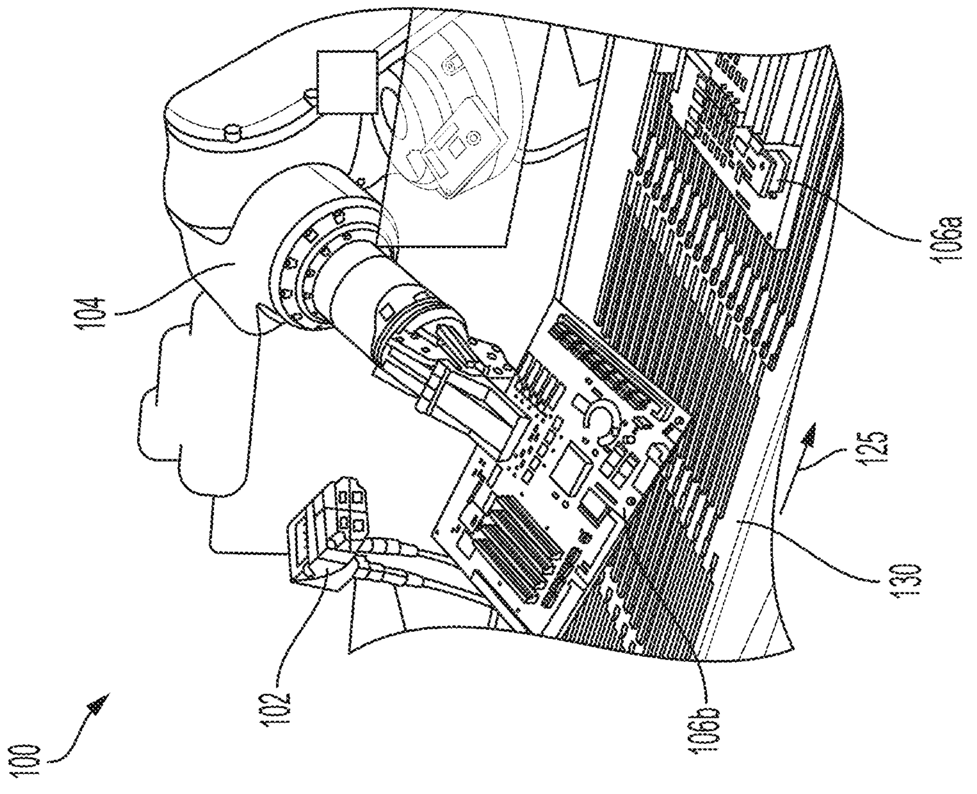
FIG. 1B is a schematic diagram illustrating an exemplary machine vision system, according to some embodiments.

The techniques described herein provide machine vision systems that can process symbols of various types with high speed and high accuracy. Such machine vision systems can be used in various applications including, for example, factory automation applications and/or logistics applications, in situations where conventional technologies can take long time to process and/or even fail to process symbols.

Conventional systems and methods can use a CNN-based (convolutional neural network) approach and/or rule-based approach for individual machine vision tasks. The CNNs, for example, are handcrafted and trained to perform individual subtasks for processing images of symbols (e.g., detecting a symbol, enhancing an image, decoding a detected symbol). Since machine vision tasks typically require multiple subtasks (e.g., one step to perform image processing, such as enhancing the image, and another step to decode the enhanced image), having to use multiple, separate subtasks increases the processing and/or complexity of such approaches. The convolution in the CNNs, however, is a local operation, and a convolution layer typically models only the relationships between neighborhood pixels of an image. Additionally, the dense features extracted by CNNs have limited receptive fields (e.g., regions in an input space that individual features correspond to), which may not distinguish indistinctive regions. The conventional systems and methods therefore cannot simultaneously support multiple subtasks for processing images of symbols via a single machine learning solution.

Further, separate trainings are needed for each subtask to train a conventional system and requires an engineer with knowledge of that specific task to perform the associated training. Training for convention systems thus can be cumbersome, and it results in a model that is limited to a specific task.

The techniques described herein provide a deep learning module configured to access (e.g., capture, receive) a raw image and provide decoding results from the raw image. The deep learning module described herein can simultaneously support multiple subtasks for processing a symbol including, for example, locating symbols in images, processing images of symbols (e.g., cropping a region of interest (ROI) of a symbol, removing distortions (see, e.g., FIG. 10A) from a raw image and/or a cropped image), and decoding information (e.g., data, image) embedded in the symbol. The vision transformer model uses multi-head self-attention in Computer Vision without requiring image-specific inductive biases. The model splits the images into a series of positional embedding patches, which are processed by the transformer encoder. It does so to understand the local and global features that the image possesses.

The advantage of the deep learning module can include one or more of the following: the deep learning module can be an end-to-end model with an image crop as input and barcode codewords as output; the deep learning module can perform barcode recognition as an image-to-sequence problem, turning a machine-vision task into a machine-translation task; the deep learning module does not rely on any traditional computer vision techniques and conventional CNN models; the deep learning module can achieves promising results with a small model, which is convolution free and does not rely on any complex pre/post-processing steps; and/or the deep learning module can be easily trained with simple cross-entropy loss and synthesized barcode images; and/or the deep learning module can free researchers from the exhausting work of designing the barcode recognition algorithm with hand-crafted features and designing rule-based decoding logic (a lot of if-then-elseif logic) while significantly improve recognition performance.

In some embodiments, the deep learning module can access (e.g., capture, receive) images of symbols that include information embedded therein, and generate predicted embedded information based on the accessed images. The predicted embedded information can include codewords (see, e.g., FIG. 9). The codewords can be further processed for generating the embedded information. Such techniques can enable fast and accurate processing of symbols, no matter what approaches are used to embed information therein. Examples of the embedding approaches can include, but are not limited to, barcodes (e.g., Code39, Code93, Code128, ITF, Codebar, DataMatrix, PDF41, Aztec, Codablock, and Maxicode), image watermarking, and signal rich art.

The deep learning module can include a barcode detection module configured to generate a ROI in the image of the symbol by, for example, generating a bounding box (e.g., bounding box 1002 in FIG. 10A) around the symbol. The bounding box can be oriented according to the orientation of the symbol, which can improve the speed and accuracy of the processing of the symbol. The barcode detection module can be configured to crop the ROI from the image of the symbol. Optionally, the barcode detection module can enhance the image of the symbol before generating the ROI including, for example, removing distortions in the image of the symbol. Alternatively or additionally, the barcode detection module can enhance the cropped image including, for example, removing distortions in the image of the symbol. The barcode detection module can also be configured to determine a type of the symbol based on the cropped image.

The deep learning module can include a barcode recognition module configured to generate the predicted information. The barcode recognition module can be configured to divide the cropped image into patches. Each patch can be converted into a one-dimensional (1D) vector and added with respective position information, which can indicate the distances between the 1D vectors. The barcode recognition module can include a cascade of blocks, which can be configured to extract the embedded information in the symbol based on such 1D vectors and respective position information. Each block can include a multi-head self-attention layer (MSA), which can be configured to determine relationships between its inputs. Each block can include a multilayer perceptron (MLP) coupled to the MSA. The MLP can be configured to extract features vectors based on its input. In each block of the cascade, the MSA and MLP can be bypassed based on, for example, the input to the block. The number of blocks in the cascade can be configurable based on, for example, the type of symbol, the quality of the image, etc. The blocks can be cascaded in any suitable manner including, for example, connecting one or more blocks in series, connecting one or more blocks in parallel or partially in parallel (e.g., connecting two blocks such that the MLP of a first block is in parallel to the second block). Such a configuration enables the barcode recognition module to provide a global operation and can model the relationships between different locations in the images.

The deep learning module can be trained in an end-to-end manner. Captured and/or synthesized images can be used to train the deep learning module. The techniques described herein also enable an engineer with no or limited knowledge about the symbols to train the deep learning module and obtain a competitive performance.

Bar Code Symbology

A barcode can refer to an optical, machine-readable representation of data. "Code" can refer to the actual data contained in the barcode. Examples of a Code can include a part number, serial number, tracking identifier, transaction code, or other data type. "Symbol" can refer to the arrangement of parallel bars and spaces that encode the data, e.g., 1D barcodes, or to the arrangement of black and white cells in a designated order in a grid, e.g., 2D matrix codes.

A barcode's symbology can refer to the encoding of information into the barcode image. For example, "Symbology" can describe how information is encoded into the physical attributes of the bars and spaces or the physical arrangement of rectangular/hexagon cells. As another example, Symbology can include a set of rules for a particular type of barcode.

The barcode symbology can generally include the following three groups:

- One-dimensional (1D) linear symbology, which can include a single row of bars and spaces. The code can be encoded by varying the width and spacing of parallel lines (width modulation), e.g., Code39, Code128, Interleaves 2 of 5, UPC-A, UPC-E, EAN 8&13, EAN-128, Codebar, Code 93, RSS14, RSS Limited, RSS Stacked, etc. It can also vary the height bars (height modulation), like Postnet Code and Four State Code.
- 2-D Stacked bar code symbology (1.5D), which can include multiple rows of width-modulated bars and spaces. Each row can have the same physical length and resemble a 1D linear symbology. Examples can include Code 49, Codablock, Code 16K, PDF417, MicroPDF417, Datastrip, Supercode, UltraCode, etc.
- Two-dimensional (2D) barcodes, which can include rectangles, dots, hexagons, and other geometric patterns, called matrix codes, can contain much more information than 1D or 1.5D barcodes. Examples can include MaxiCode, Data Matrix, Aztec Code, QR Code, Vericode, Array Tag, Dotcode, LEB-code, MiniCode, and GridMatrix Code.

"Codewords," which may also be referred to as symbol character values, can include intermediate levels of coding between source data and a graphical encodation in a symbol.

Figure 9:
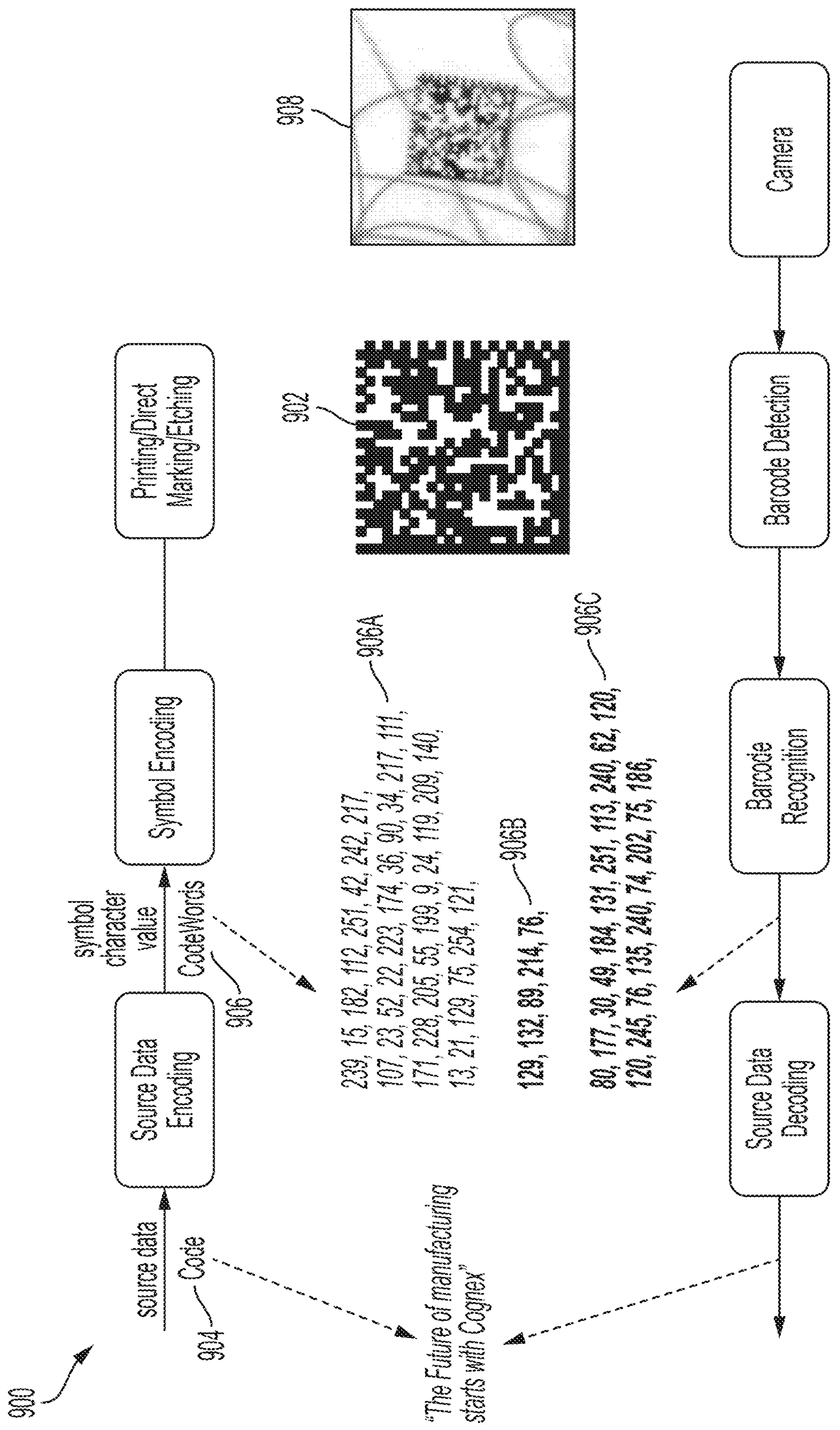
FIG. 9 is a block diagram illustrating methods of encoding and decoding a data matrix code, according to some embodiments.

For example, FIG. 9 illustrates a method 900 of encoding and decoding a data matrix code 902. To encode a code 904 (e.g., "The Future of manufacturing starts with Cognex"), the method 900 can start with encoding the code 904 into codewords 906. The codewords 906 can include data embedding 906A, padding 906B, and error correction codes 906C. Next, the method 900 can generate the data matrix code 902 based on the codewords 906. The generated data matrix code 902 can be applied to an object surface by, for example, printing, direct marking, and etching.

To decode the data matrix code 902 applied to an object surface, the method 900 can start with capturing an image 908 of the object surface with the data matrix code 902. Next, the method can detect a location of the data matrix code 902 in the image, generate codewords based on the detected portion of the image 908, and finally decipher the code based on the codewords.

Limitations of Conventional Rule-Based Barcode Recognition

Conventional barcode recognition algorithms are rule-based and rely on hand-crafted features, such as histograms of pixel gray values and gradients, connected components, boundary tracing, line and corner detection, texture analysis, etc. The low capabilities of these features limit the barcode reading performance. In practical applications, barcodes usually appear with worse image quality, more complex backgrounds, and more noise, which requires the recognition algorithm system to have the ability to deal with real-world complexity.

Further, since the rule of encoding is different for different barcode symbology, conventional barcode recognition algorithms must be custom designed for the different barcode symbology. It is common to see that the reading capacity varies significantly from one software to another. Companies often need to purchase/install different barcode software to read different symbology.

Barcode Detection and Barcode Identification

According to aspects of the present application, an end-to-end barcode reading system can include modules configured for barcode detection and barcode identification.

Barcode detection can refer to providing compact barcode instance image crops for barcode identification. Barcode detection can include barcode location and barcode verification. Barcode localization can locate barcode components and group the located barcode components into barcode candidate regions. Barcode verification can determine the barcode candidate regions as barcode regions and non-barcode regions, filter the determined non-barcode regions, and determine the type and version of the barcode symbology of the determined barcode regions.

Barcode identification can include barcode enhancement and barcode recognition. Barcode enhancement can be included as a preprocessing process to recover barcode regions that are degraded, improve resolution of the barcode regions, remove the distortion of the barcode regions, and/or remove the background of the barcode regions, which can reduce the difficulty of barcode recognition. Alternatively or additionally, barcode enhancement can include a barcode rectification process, which can normalize the input images of the barcode regions and remove the distortion of the barcode regions (e.g., perspective or arbitrary curving shape). Barcode recognition can decipher/translate an image of a barcode region into a target message encoded in the barcode in the barcode region. Optionally, barcode recognition can provide the code embedded in the barcode.

EMBODIMENTS

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1A:
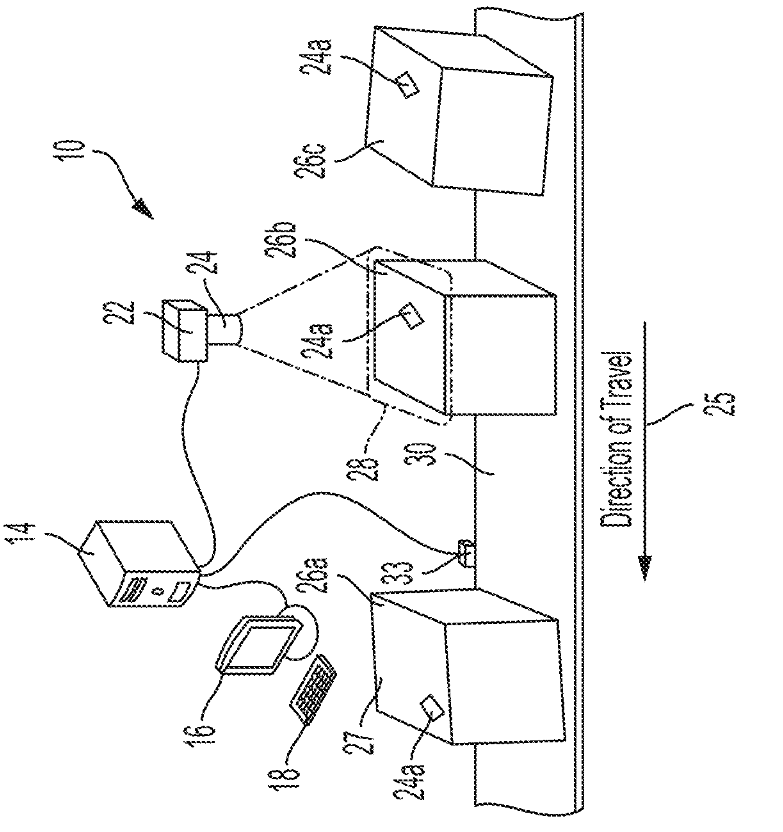
FIG. 1A is a schematic diagram illustrating an exemplary machine vision system, according to some embodiments.

Referring to FIG. 1A, aspects of the techniques discussed herein will be described in the context of an exemplary machine vision system 10 wherein a transfer line 30 moves objects 26*a*, 26*b*, 26*c*, etc., along a direction of travel 25. A person of ordinary skill would understand that the machine vision system 10 is an exemplary fixed-mount application and that the disclosed systems and methods for processing symbols on objects are applicable in other applications, including hand-held applications.

In the present example, each of the objects has similar physical characteristics and therefore, only one object, for example, object 26*b*, will be described in detail. Specifically, object 26*b* includes a surface 27 which faces generally upward as object 26*b* is moved by transfer line 30. A symbol 24*a* is applied to the surface 27 for identification purposes. The symbol 24*a* can be printed on a label attached to the surface 27, or directly marked on the surface 27. Similar-type symbols 24*a* are applied to surfaces of each of objects 26*a* and 26*c*. Although the illustrated example shows the surface 27 as a top surface of a cubic object, it should be appreciated that a symbol can be on any surface of an object with any shape.

The machine vision system 10 includes a sensor 22 including optics 24 that define a field of view (FOV) 28 below the sensor 22 through which transfer line 30 moves the objects 26*a*, 26*b*, 26*c*, etc. Thus, as the objects move along direction of travel 25, each of the surfaces 27 comes into field of view 28. Field of view 28 can be large enough such that the surface 27 is at least partially located at one point or another within the field of view 28 such that any code applied to the surface 27 of an object passes through the field of view 28 and can be captured in an image by sensor 22. As the objects move along the direction of travel 25, the sensor 22 can capture partial fragments of the symbol 24*a* applied to the surface 27. As the sensor 22 may need to be fixedly mounted and have a medium to short imaging/sensing distance, the sampling rates can be lower than desired due to the short time that the products are within the FOV of the sensor 22.

The machine vision system 10 also includes a computer or processor 14 (or multiple processors) which receives images from sensor 22, examines the images to identify sub-portions of the images that may include an instance of a symbol as symbol candidates and then attempts to decode each symbol candidate in an effort to identify the object currently within the field of view 28. To this end, sensor 22 is linked to processor 14. An interface device 16/18 can also be linked to processor 14 to provide visual and audio output to a system user as well as for the user to provide input to control the machine vision system 10, set system operating parameters, trouble shoot system problems, etc. A person of skill in the art will appreciate that while the sensor 22 is shown separate from the processor 14, the processor 14 can be incorporated into the sensor 22, and/or certain processing can be distributed between the sensor 22 and the processor 14. In at least some embodiments, the machine vision system 10 also includes a tachometer (encoder) 33 positioned adjacent transfer line 30 which may be used to identify direction of travel 25 and/or the speed at which transfer line 30 transfers objects through the field of view.

Figure 2B:
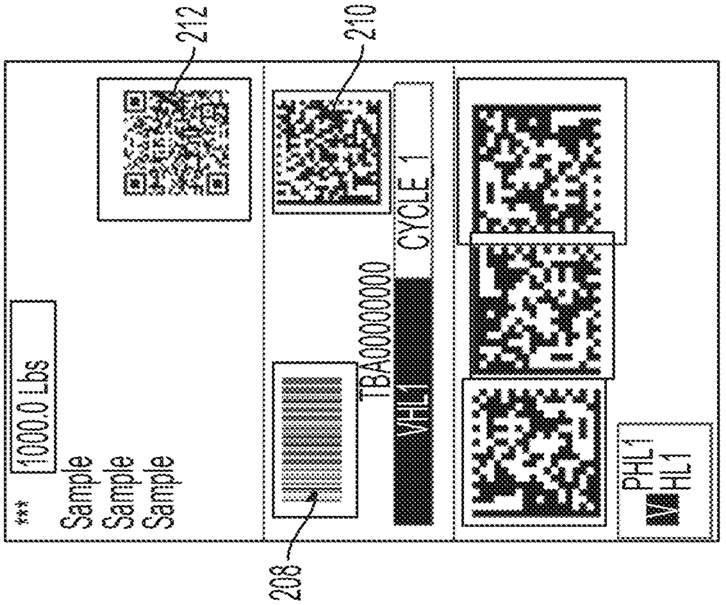
FIG. 2B is an exemplary printed label with various types of barcodes.
Figure 2A:
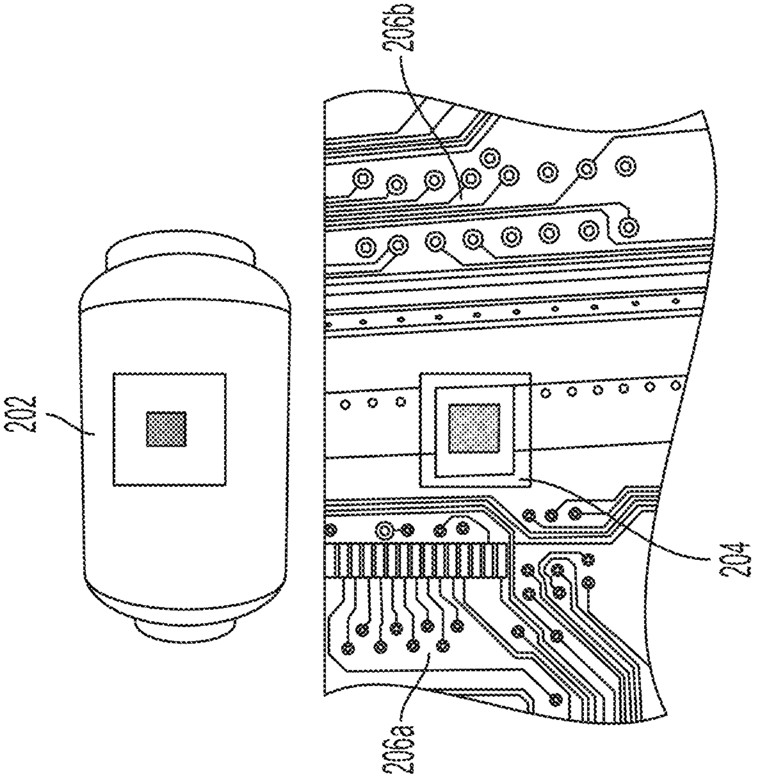
FIG. 2A are images illustrating two-dimensional (2D) barcodes marked on objects.

In some embodiments, the sensor 22 and processor 14 are Cognex industrial, image-based barcode recognition modules that scan and read various symbols, such as 1D symbol, stacked symbol, postal symbol, and 2D symbol (see, e.g., FIGS. 2A-2B). In some embodiments, the techniques discussed herein are at least partially executed on a system embedded in the sensor 22, which includes dedicated memory and computational resources to perform the image processing (e.g., to perform the machine vision techniques discussed herein). In some examples, a single package houses a sensor (e.g., an imaging device) and at least one processor (e.g., a programmable processor, a field programmable gate array (FPGA), a digital signal processor (DSP), an ARM processor, deep learning accelerator such as GPU, NPU, TPU, etc., for efficiently executing CNN-based or transformer-based models, and/or the like) configured to perform image processing.

As another example, FIG. 1B shows an exemplary machine vision system 100 wherein a transfer line 130 moves objects 106*a*, 106*b*, etc., along a direction of travel 125. As illustrated in FIG. 1B, the objects can be compact, integrated electronic components that have symbols directly marked thereon at limited locations so as not to interrupt the functions of the electronic component. The machine vision system 100 can include a symbol reader 102 configured to read various symbols on the objects. The symbol reader 102 can include sensor (e.g., sensor 22) and processor (e.g., processor 14), which can be fully integrated, partially integrated, or discrete components as the present disclosure may not be limited in these aspects. The symbol reader 102 can communicate the decode results to other components along the transfer line 130 such as the robotic arm 104 such that appropriate actions can be performed with respect to the products according to the decode results of the symbols. For example, a symbol can be on a side surface of the object 106*b*. According to the information in the decode results of that symbol, the robotic arm 104 can place the side surface at a direction perpendicular to the direction of travel 125 such that the object 106*b* is similarly positioned as the object 106*a* and ready for the next action (e.g., inserting cards into the sockets on the object 106*b*).

Similar to the machine vision system 10, the machine vision system 100 can include a computer or processor (or multiple processors) which receives images from symbol reader 102, examines the images to identify sub-portions of the images that may include an instance of a symbol as symbol candidates and then attempts to decode each symbol candidate in an effort to identify the object currently within the field of view. A person of skill in the art will appreciate that while symbol reader 102 can be linked to the computer or processor (or multiple processors) (e.g., equipped with or without deep learning hardware accelerator, GPU, NPU, TPU, etc.) via an interface device or be integrated with the computer or processor (or multiple processors).

FIG. 2A shows a 2D barcode 202 directly marked on a curved surface of an object; and a 2D barcode 204 directly marked on a printed circuit board between two circuit areas 206*a* and 206*b*. Due to various reasons such as hard surface material, poor surface flatness, and/or limited surface area, the direct-mark symbols can have poorer quality than the symbols printed on labels, which makes more challenging to process the direct-mark symbols. FIG. 2B shows an exemplary print label, which may be used in logistic application, with symbols such as 1D code 208, DataMatrix 210, QR code 212, etc. printed thereon.

Figure 3:
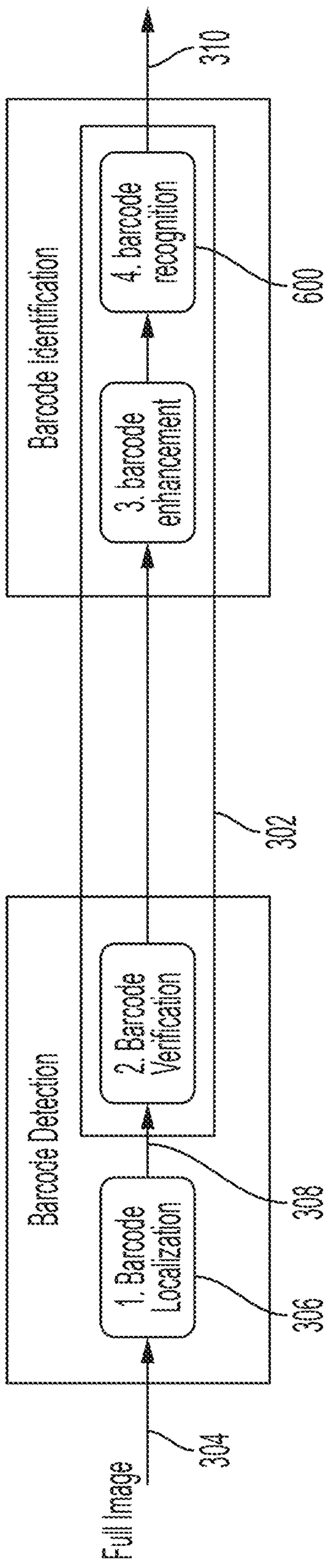
FIG. 3 is a block diagram illustrating an exemplary system configured to process a symbol, according to some embodiments.

FIG. 3 shows an exemplary system 300 configured to process a symbol. The system 300 can include a barcode localization module 306 configured to receive input 304 (e.g., camera captured images of objects) and provide image crops 308 of input 304 (e.g., images of candidate barcode regions). The input 304 can include images of symbols that include information (e.g., Code) embedded therein. As described above, the information can be embedded in the symbols with various embedding approaches such as barcodes (e.g., Code39, Code93, Code128, ITF, Codebar, DataMatrix, PDF41, Aztec, Codablock, and Maxicode), image watermarking, and signal rich art.

Figure 4:
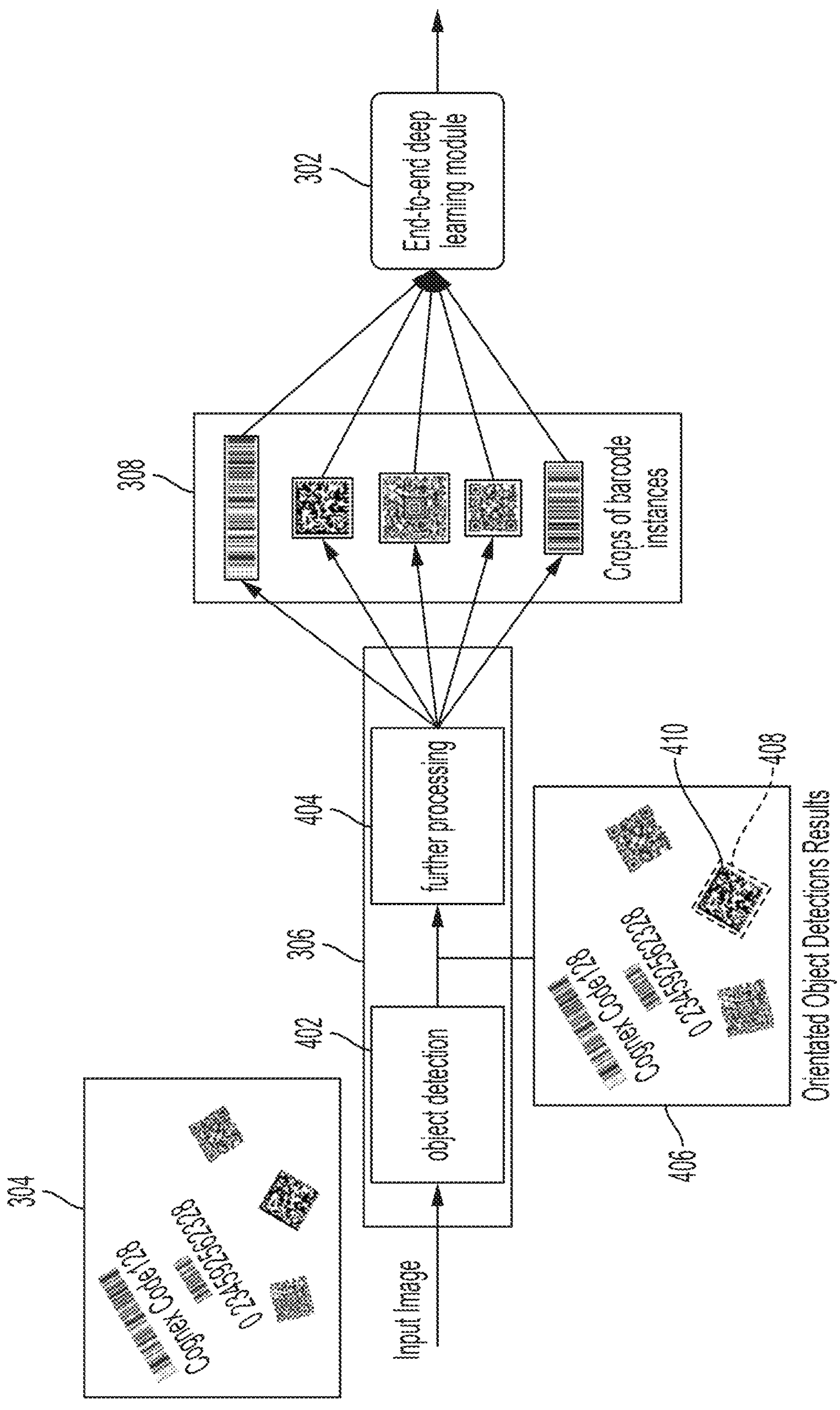
FIG. 4 is a block diagram illustrating an exemplary barcode localization module of the system of FIG. 3, according to some embodiments.

FIG. 4 shows an exemplary barcode localization module 306, which can be configured as an image-segmentation-based computer vision algorithm or a deep learning-based rotated object detection convolutional network. The barcode localization module 306 can include an object detection module 402 and a further processing module 404. The object detection module 402 can be configured to locate barcode candidate regions 408 with bounding boxes 410 oriented according to located barcodes (rather than an arbitrary horizontal bounding box) such that each barcode candidate region 408 would include a single barcode (rather than potentially multiple barcodes with an arbitrary horizontal bounding box). The barcode candidate regions 408 can have complex background, blurs, and/or irregular deformation. The further processing module 404 can be configured to generate image crops 308 by cropping and/or unrotating the candidate barcode regions 408. Such an object detection module can remove minimum constraints such as contrast, quiet zone, and intactness of the finder pattern, which are often imposed on the images by conventional systems.

Referring back to FIG. 3, the system 300 can include a deep learning module 302 configured for barcode verification, barcode enhancement, and barcode recognition. The deep learning module 302 can be configured to directly convert image crops 308 into predicted embedded information 310. The predicted embedded information 310 can include codewords corresponding to the information embedded in respective symbols in the image crops 308 (see, e.g., FIG. 9A). The predicted embedded information 310 can be processed for decoding the information (e.g., Code) by, for example, Reed Soloman error corrections, Checksum error checking, and/or symbol-to-ASCII character look-up-table mapping.

Figure 5:
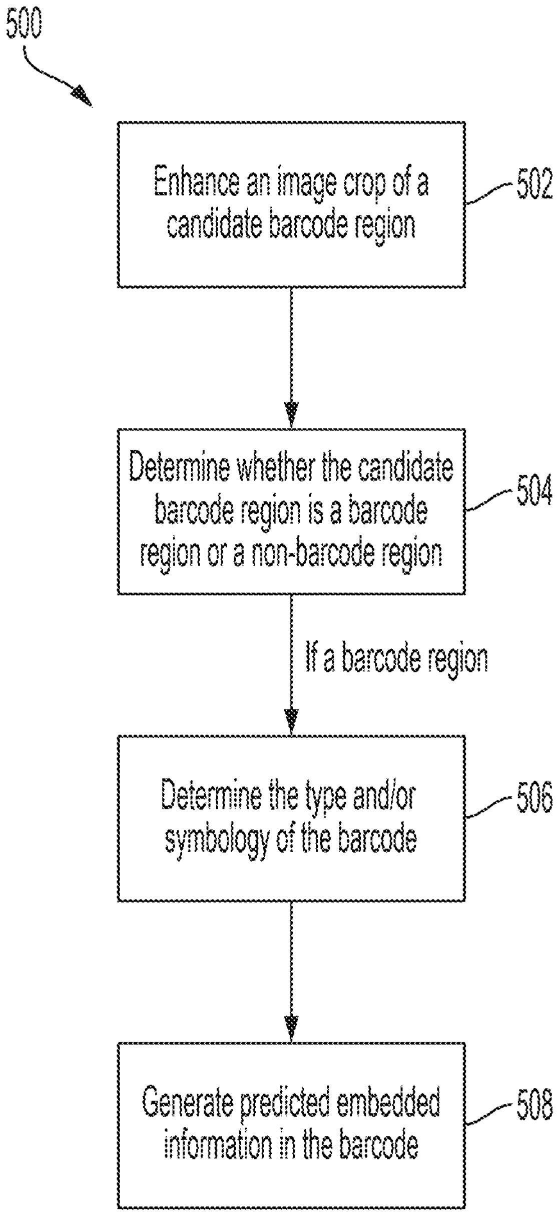
FIG. 5 is a flow chart illustrating a method for processing a symbol with a deep learning module of the system of FIG. 3, according to some embodiments.

FIG. 5 shows a method 500 for processing a symbol with the deep learning module 302. As illustrated, the method 500 can begin with step 502 to enhance an image crop of a candidate barcode region, which can include, for example, removing distortions (see, e.g., FIG. 10A) in the image crop. At step 504, the method 500 can determine whether the candidate barcode region is a barcode region or a non-barcode region. If it is determined that the candidate barcode region is a barcode region, at step 506, the method 500 can determine the type and/or symbology of the barcode. For example, the type and/or symbology of the barcode can be used to determine a length of the codewords. At step 508, the method 500 can generate predicted embedded information (e.g., codewords) in the barcode. It should be appreciated that one or more of the steps described herein can be optional and/or performed in a different order.

According to aspects of the present application, the barcode recognition module 600 can be configured to perform the following steps: 1) splitting an image into patches (which can have fixed sizes); 2) flattening the image patches; 3) generating lower-dimensional linear embeddings from the flattened image patches; 4) adding positional embeddings to the flattened image patches; and 5) estimating codewords embedded in a symbol in the image by passing the combined input embedding through the models. Optionally, adding the positional embeddings to the flattened image patches can add a position-dependent pattern of values arranged in a vector. If the pattern is characteristic for each position, the attention heads and feed-forward layers in each block can learn to incorporate positional information into respective transformations.

Figure 6A:
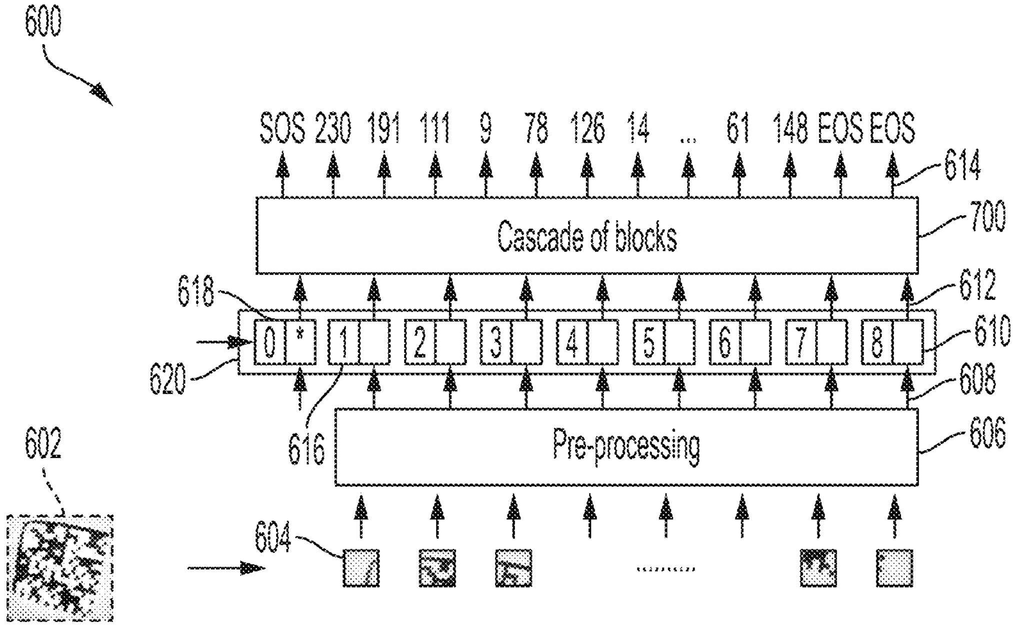
FIG. 6A is a block diagram illustrating an exemplary barcode recognition module of the deep learning module of the system of FIG. 3, showing decoding a 2D matrix barcode, according to some embodiments.
Figure 6B:
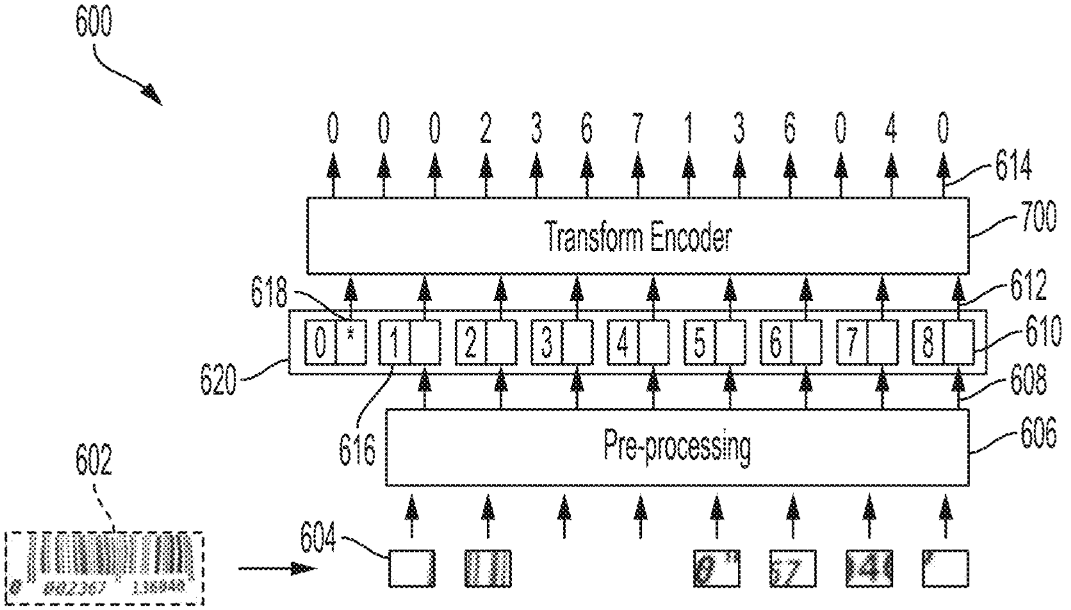
FIG. 6B is another block diagram illustrating the exemplary barcode recognition module of the system of FIG. 3, showing decoding a 1D linear barcode, according to some embodiments.

FIG. 6A and FIG. 6B show the barcode recognition module 600 configured to generate the predicted embedded information 310, showing decoding a 2D matrix barcode and a 1D linear barcode, respectively. As illustrated, the barcode recognition module 600 can receive an image 602 (e.g., an image crop 308, an image of an enhanced barcode region determined at step 502, an image of a barcode region determined at step 504 of method 500, etc.), which can have a dimension of H×W with C channels and therefore be represented as $x \in R^{H \times W \times C}$. The barcode recognition module 600 can divide the image 602 into N patches 604, each of which can have a dimension of P×P. Although it is illustrated that the image 602 is divided into eight patches, it should be appreciated that N can be any suitable number. The N patches 604 can therefore be represented as $x^p \in R^{N \times P^2 C}$.

The barcode recognition module 600 can include a pre-processing sub-module 606 configured to covert the patches 604 into one-dimensional (1D) vectors 610. The pre-processing sub-module 606 can flatten the patches 604 to size D via linear projection for generating the 1D vectors 610. The size D can correspond to the dimension of the embedded information that are constant to a cascade of blocks 700 that is configured to generate the predicted information 310 based on the converted 1D vectors 610.

The barcode recognition module 600 can include a sub-module 620 configured to add respective position information 616 to each of the 1D vectors 610. The respective position information 616 can indicate distances between the 1D vectors 614. The sub-module 620 can also be configured to add a 1D vector 618 and respective position information to the converted 1D vectors 610. The added 1D vector 618 and respective position information can be used to generate vectors indicating a start of the predicted embedded information (e.g., [SOS]), padded special character (e.g. [PAD]) to make sequence to be of the maximum target codeword length, and/or an end of the predicted embedded information (e.g., [EOS]). In some embodiments, [EOS] may be used to replace [PAD] for simplicity.

The barcode recognition module 600 can include a cascade of blocks 700 configured to extract feature vectors 614 based on the converted 1D vectors 610 and respective position information and/or the added 1D vector 618 and respective position information. Each extracted feature vector can correspond to a codeword. The number of extracted feature vectors 614 can equal to the maximum length of codewords for the target symbol type plus the number needed for the [SOS] and [EOS] vectors. In the illustrated example, one [SOS] vector is used to mark the beginning of the codewords and two [EOS] vectors are used to indicate the end of the codewords.

Figure 6E:
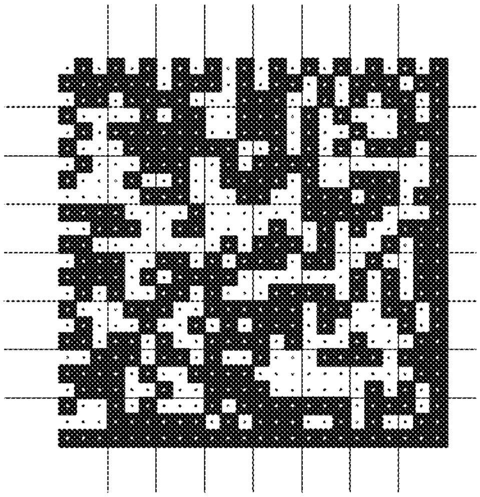
FIGS. 6C-6E are exemplary outputs of the barcode recognition module of FIG. 6A.
Figure 6D:
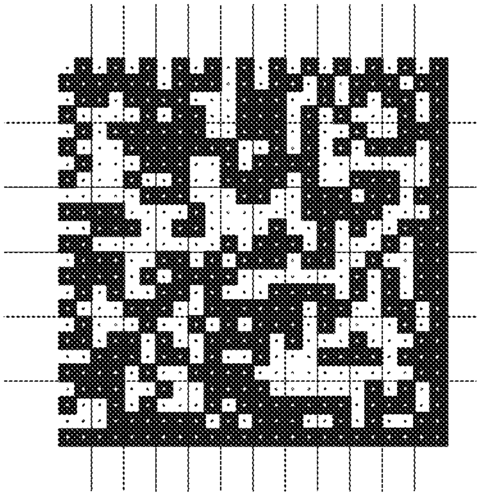
Figure 6C:
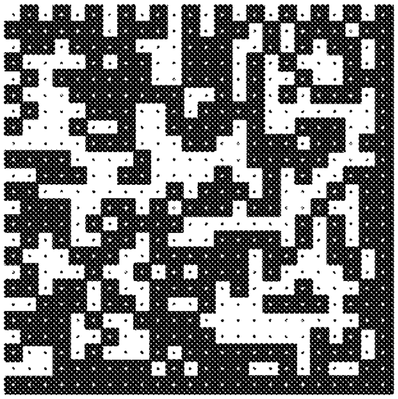

Although codewords are described as examples of extracted feature vectors, it should be appreciated that, in some embodiments, the extracted feature vectors can correspond to intermediate digital representations of the codewords, which can be used to reconstruct the original data matrix image for extracting the codewords. For example, the intermediate digital representations can include intermediate ordered binary module value sequence (e.g., FIG. 6C), byte sequence from 2×4 tiles (FIG. 6D), byte sequence from 3×3 tiles in the top-left to bottom-right, zig-zag order (e.g., FIG. 6E).

Figure 7:
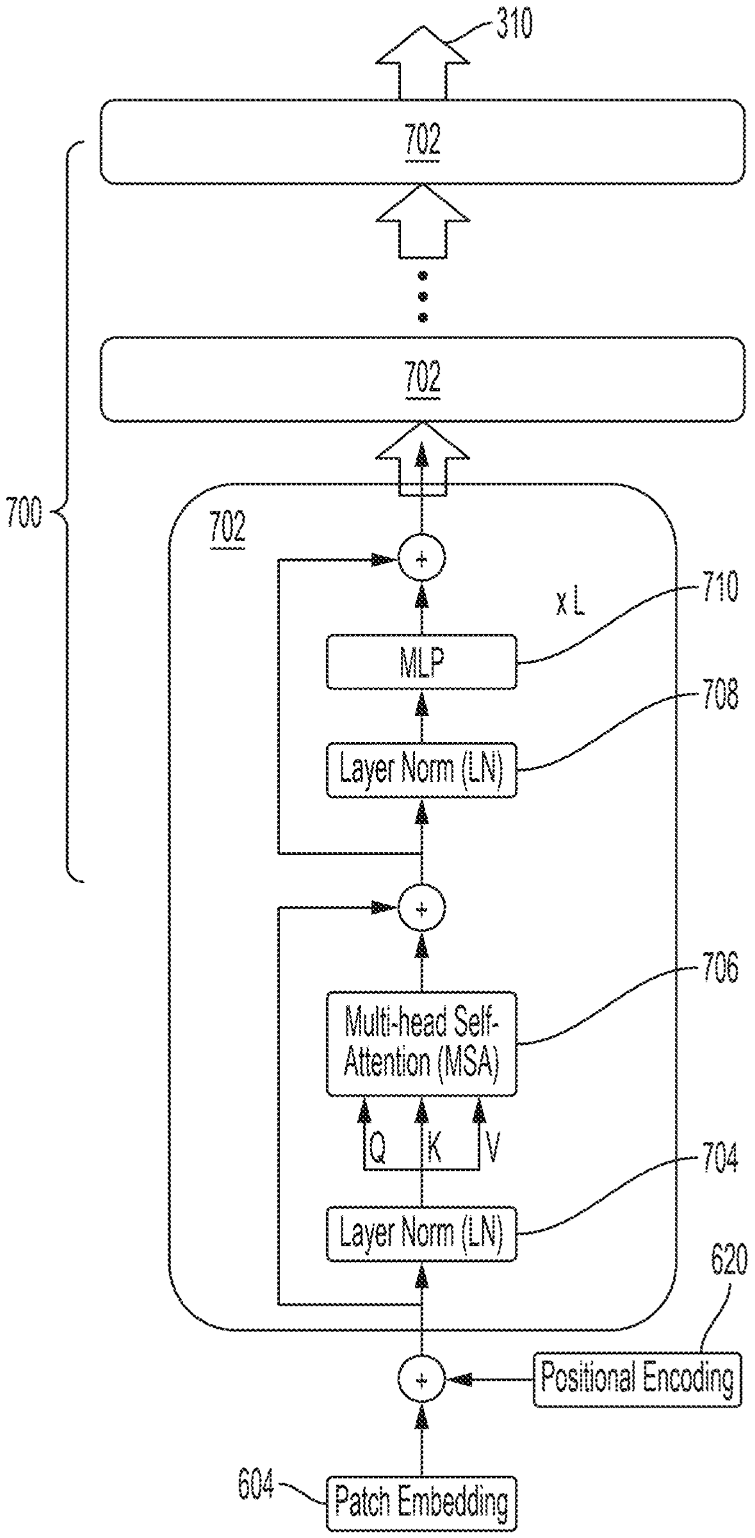
FIG. 7 is a block diagram illustrating a cascade of blocks of the exemplary barcode recognition module of FIG. 6A, according to some embodiments.

FIG. 7 is a block diagram illustrating the cascade 700 of blocks 702. Each block can receive a sequence of embeddings and feeds the embeddings through MSAs and fully connected feed-forward layers. The output of each block can have the same size as the inputs. The cascade 700 of blocks 702 can be configured to update the input embeddings to produce representations that encode some contextual information in the sequence (e.g., codewords).

As illustrated, each block 702 can include a multi-head self-attention layer (MSA), which can be configured to determine relationships between its inputs. Each block can include a multilayer perceptron (MLP) coupled to the MSA. The MLP can be configured to extract features vectors based on its input. In some embodiments, the MLP can be made of two layers with GELU (Gaussian error linear unit) activation. As illustrated, every input can go through a layer normalization (LN). As a LN does not include any new dependencies between the training images, such a configuration can help improve the training time and overall performance. Residual connection can be placed between the output of LN and MSA/MLP as residual connections can enable the components to flow through the network directly without passing through non-linear activations.

Each block 702 can take the intermediate context embedding $x \in \mathbb{R}^{N \times D}$ from its predecessor block 702 and processes the context embedding with an MSA to learn the pairwise relation. The output features from the MSA can be input into an MLP with activation and dropout layers. Layer norm can be applied between the MSA and MLP. Residual connection can be added before a first fully connected (FC) layer and after a second FC layer to facilitate the optimization of deep layers.

An MSA module can take in a set of input embeddings notated as $x=[x_1, \ldots, x_N] \in \mathbb{R}^{N \times D}$, and outputs a weighted summation $x'=[x'_1, \ldots, x'_N] \in \mathbb{R}^{N \times D}$ of input embedding within x, F=Att(Q=x, K=x, V=x). The scaled dot-product attentions can include a set of M queries $Q \in \mathbb{R}^{M \times D}$, a set of N key value pairs denoted as a key matrix $K \in \mathbb{R}^{N \times D}$ and a value matrix $V \in \mathbb{R}^{N \times D}$. Q, K, V can be set to have same feature dimension D. The attention operation F can be defined as:

$$F = Att(Q, K, V) = \text{softmax}\left(\frac{QK^T}{\sqrt{d}}\right)V$$

The MSA can calculate attention weights for each pixel in the image based on its relationship with all other pixels, while the feed-forward layer can apply a non-linear transformation to the output of the MSA. The multi-head attention can extend this mechanism by allowing the model to simultaneously attend to different parts of the input sequence, which are key to barcode decoding.

In some embodiments, the input to the cascade of blocks 700 can be:

$$x_0 = \left[x_p^1 E; x_p^2 E; \ldots ; x_p^N E\right] + E_{pos}, \quad (1)$$

where $E \in \mathbb{R}^{p^2 C \times D}$ and $E_{pos} \in R^{N \times D}$.

The output of an MSA can be $$x'_l = MSA(\mathrm{LN}(x_{l-1})) + x_{l-1}, \tag{2}$$

For l=1, . . . , L. L is the depth or the number of blocks in the cascade of blocks 700.

The output of a MLP can be $$x_l = MLP(\mathrm{LN}(x'_l)) + x'_l,\ l = 1, \ldots , L. \tag{3}$$

Finally, the predicted embedded information is made of a sequence of linear projections forming the word prediction:

$$y_l = \mathrm{Linear}(x_l^i), \tag{4}$$

For l=1, . . . , S. S is the maximum codewords length plus the number needed for the [SOS] and [EOS] vectors.

In each block of the cascade, the MSA and MLP can be bypassed based on, for example, the input to the block. The number of blocks in the cascade can be configurable based on, for example, the type of symbol, the quality of the image, etc. Although it is illustrated that the blocks are connected in series, it should be appreciated that the blocks can be cascaded in any suitable manner including, for example, connecting one or more blocks in parallel or partially in parallel (e.g., connecting two blocks such that the MLP of a first block is in parallel to the second block). Such a configuration enables the barcode recognition module 600 to provide a global operation and can model the relationships between different locations in the image 602.

Although an exemplary cascade 700 of blocks 702 is illustrated, it should be appreciated that a block 702 may have any suitable configuration, and/or any suitable number of blocks can be cascaded in any suitable structure. The present disclosure is not intended to be limited in these aspects. The deep learning module 302 can be implemented with various models (e.g., Model 1, Model 2, Model 3 in FIG. 10B).

Figure 8:
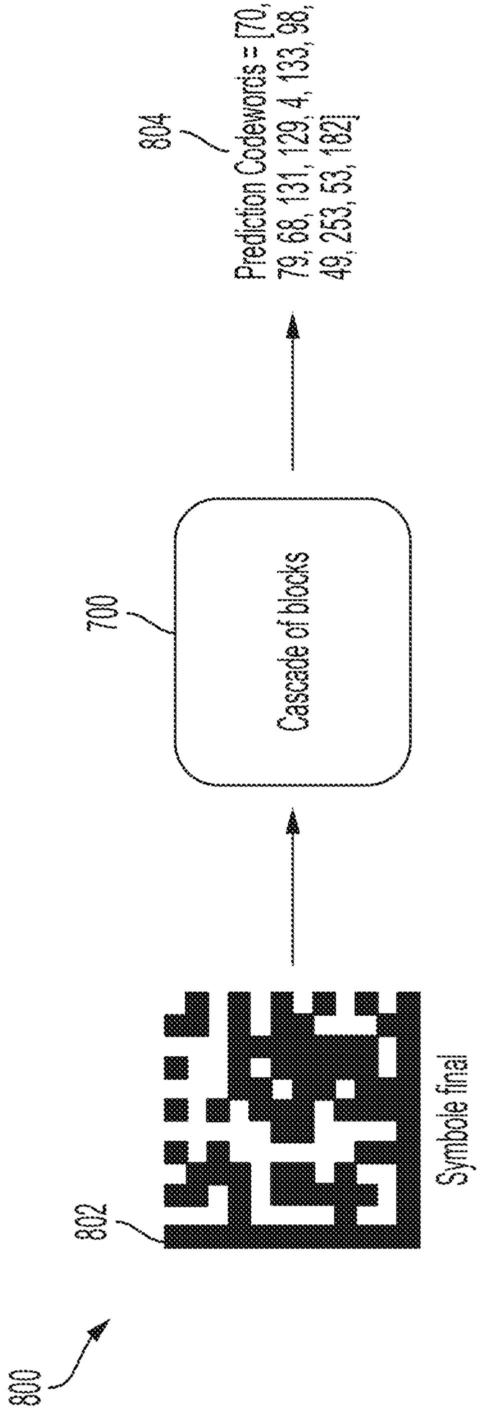
FIG. 8 is a block diagram illustrating a method for processing an image with the cascade of blocks of FIG. 7, according to some embodiments.

FIG. 8 shows a method 800 for processing a symbol with the cascade of blocks 700. As illustrated, the method 800 can access an image 802 that has a symbol and generate a sequence of codewords 804 that correspond to the symbol. The method 800 described herein can provide a simple and generic framework for reading any computer-readable visual codes (not limited to the barcodes) in an end-to-end manner. Unlike existing CNNs-based and/or rule-based approaches that explicitly integrate prior barcode recognition knowledge about the task, the method 800 generates the target codewords 804 and therefore can be conditioned solely on the accessed image 802. The objective function can be simply the maximum likelihood of codewords solely conditioned on the accessed image 802.

Figure 10A:
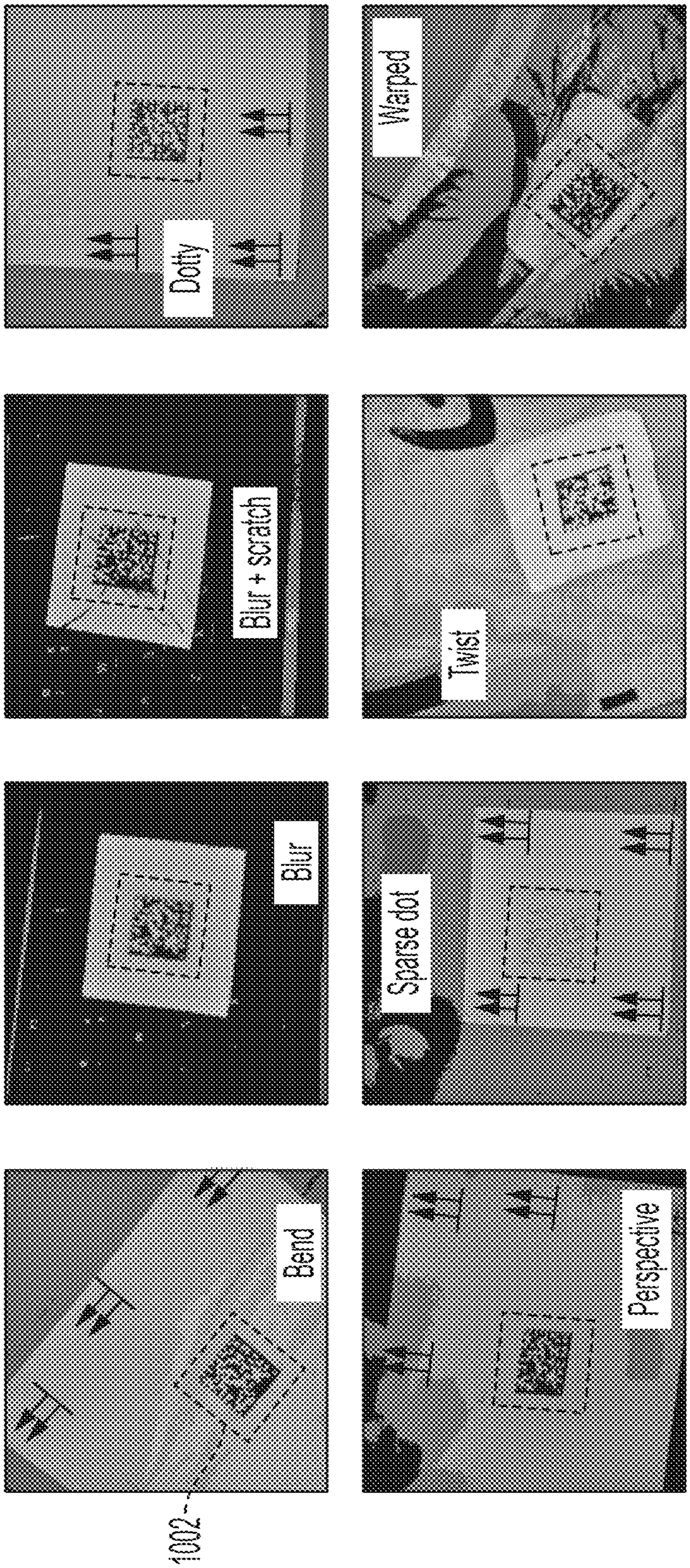
FIG. 10A shows exemplary images of symbols with distortion.
Figure 10B:
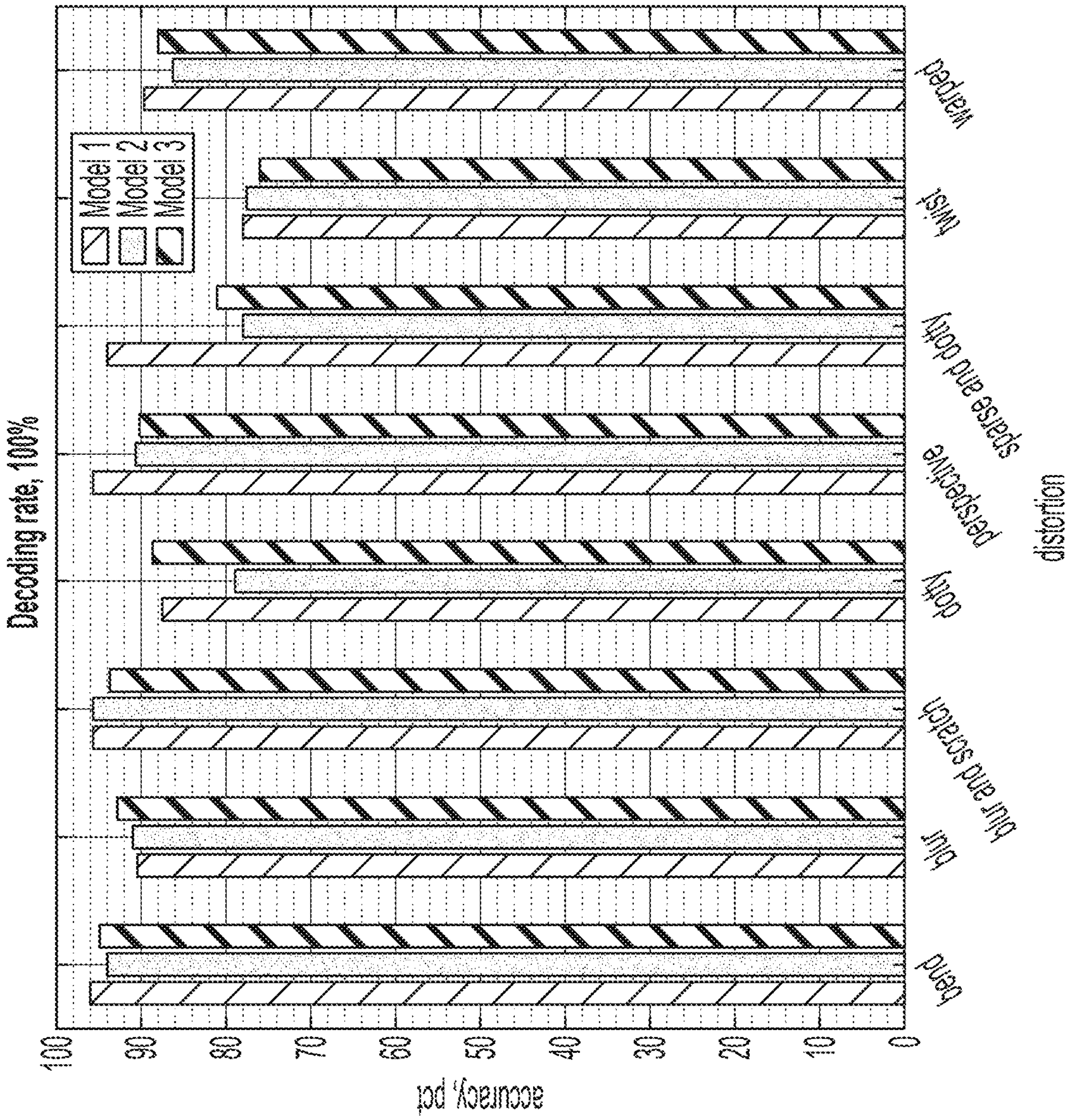
FIG. 10B is a chart illustrating the rate of decoding with various models of the deep learning module of the system of FIG. 3.

FIG. 10A shows exemplary images of symbols with distortions including, for example, bending, blurring, blurring and scratch, dotty, perspective, sparse dot, twisting, warped. The system 300 can generate oriented bounding boxes for individual symbols (e.g., bounding box 1002). FIG. 10B is a chart illustrating the rate of decoding with various models of the deep learning module 302. Each model can have different number of blocks and/or various cascading structure of the blocks. As illustrated, the illustrated models of the deep learning module 302 can read the images of symbols with distortions with high speed (at least two times faster than conventional system) and high accuracy (generally above 80%).

According to aspects of the present application, the deep learning module 302 can be trained in an end-to-end manner.

Figure 11:
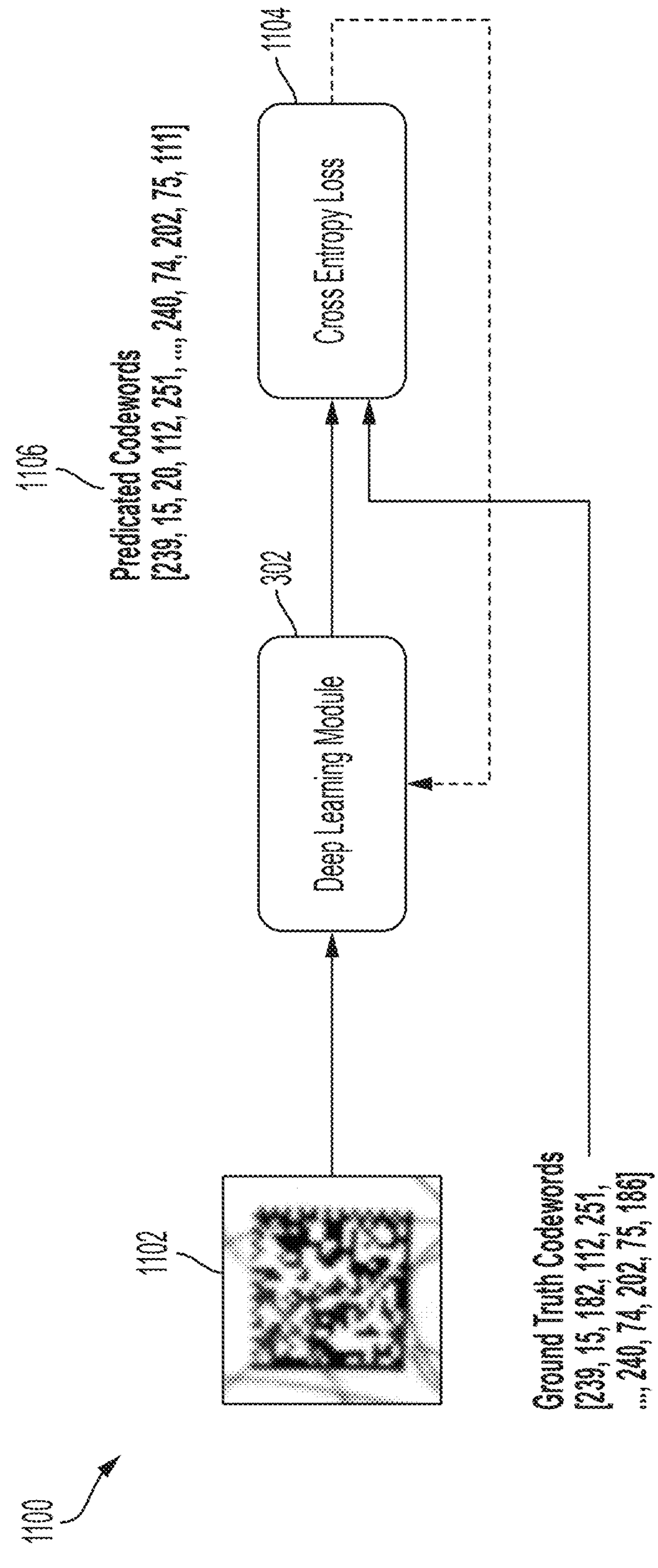
FIG. 11 is a block diagram illustrating a method of training the deep learning module of the system of FIG. 3, according to some embodiments.

FIG. 11 shows a method 1100 of training the deep learning module 302. As the learning module 302 does not have some inductive biases compared to CNNs, and the learning module 302 can rely heavily on massive datasets for large-scale training. The learning module 302 can require a diversity of image synthesizing algorithms are used to synthesize millions of barcode images. In some embodiments, the learning module 302 can be pre-trained with synthesized images, and then fine tuned with real captured barcode images (e.g., thousands of images). The method 1100 can use a cross-entropy loss module 1104 to evaluate the performance of the deep learning module 302 by comparing the predicted output with the actual output. The loss function can measure the difference between the predicted and actual output and updates the model's parameters during training. As an example, loss function parameters can be considered a measure of how well a model performs at its task; and the goal of the training can be to minimize the loss function so as to improve the performance of the deep learning module 302.

In the illustrated example, an image crop 1102 that has a barcode instance with the ground truth codewords $Y=[y_0, y_1, \ldots, y_N]$ is passed to the deep learning module 302, which generates the codeword predictions 1106 $\hat{Y}=[\hat{y}_0, \hat{y}_1, \ldots, \hat{y}_N]$. Each codeword can be any discrete integer value between 0 and K−1, K is the biggest integer for each codeword. The method 1100 can compute a score $$s_n^k(\hat{y}_n)$$

for each codework $\hat{y}_n$, $0<<n\leq N-1$ being the value of k, $0<<k\leq K-1$. The method 1100 then can estimate a probability $$\hat{p}_n^k$$

that the codeword is equal to k by running the scores through a softmax function, which computes the exponential of every score, then normalizes the exponential of every score (e.g., dividing by the sum of all the exponentials). The scores can be referred to as logits $$\hat{p}_n^k = \frac{\exp(s_n^k)}{\sum_{j=0}^{K-1} \exp(s_n^j)}$$

In this equation, K is the maximum possible integer value for each codeword, $$s_n^k(\hat{y}_n)$$

is score of the $n^{th}$ codeword $\hat{y}_n$ to be the value of k, $\hat{y}_n=k$. The objective is to have a model that estimate a high probability for the target codeword integer value (and consequently a low probability for the other value), Minimizing the cost function, called the cross-entropy, should lead to this objective because it penalizes the model when it estimates a low probability for a target class. Cross entropy is used to measure how well a set of estimated class probabilities matches the target classes.

$$J(\theta) = -\frac{1}{N}\sum_{i=1}^{N}\sum_{k=1}^{K} y_i^{(k)}\log\left(\hat{p}_i^{(k)}\right)$$

Figure 12A:
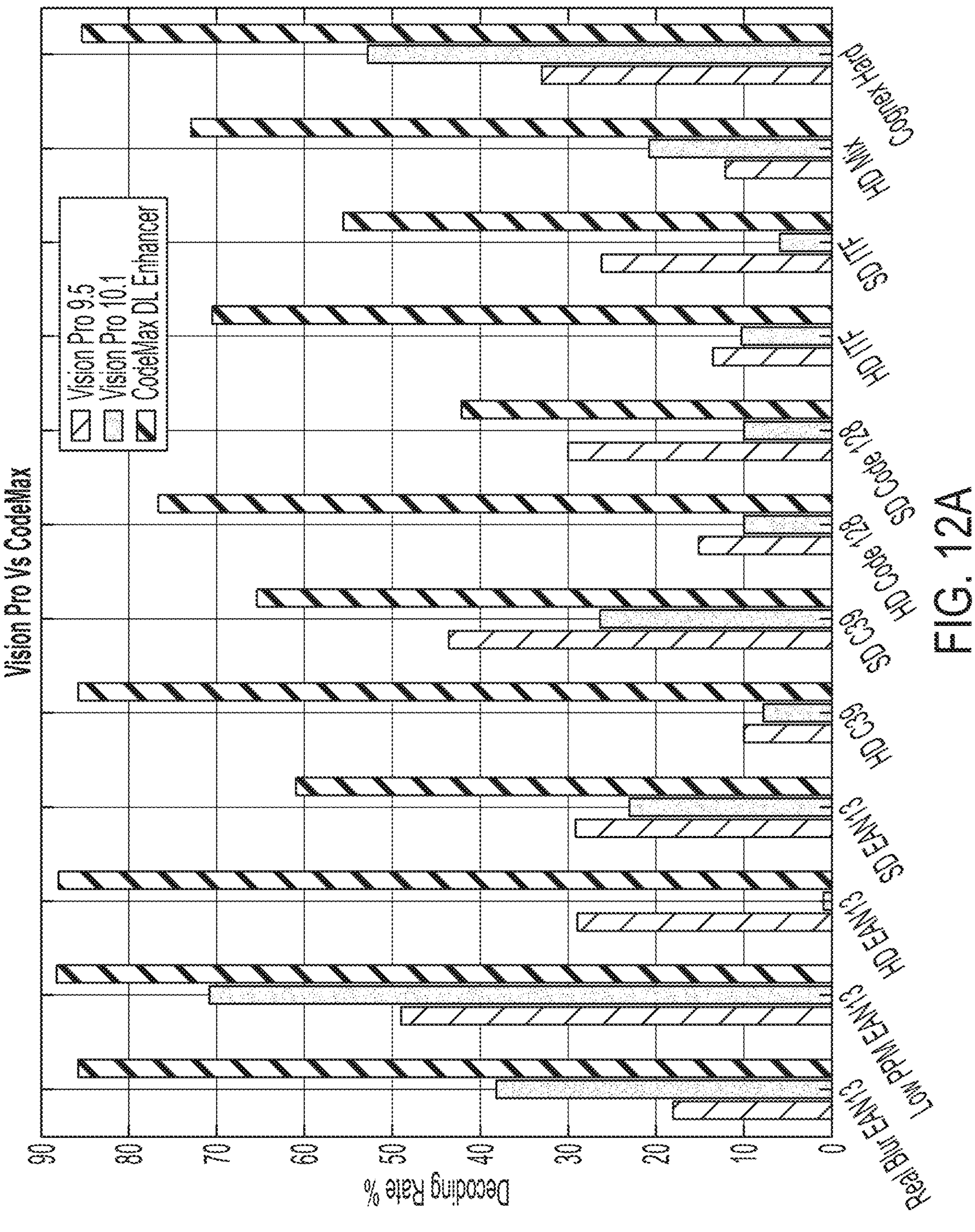
FIG. 12A is a chart illustrating the rate of decoding various types of exemplary codes with deep learning module of the system of FIG. 3, compared with conventional systems.
Figure 12B:
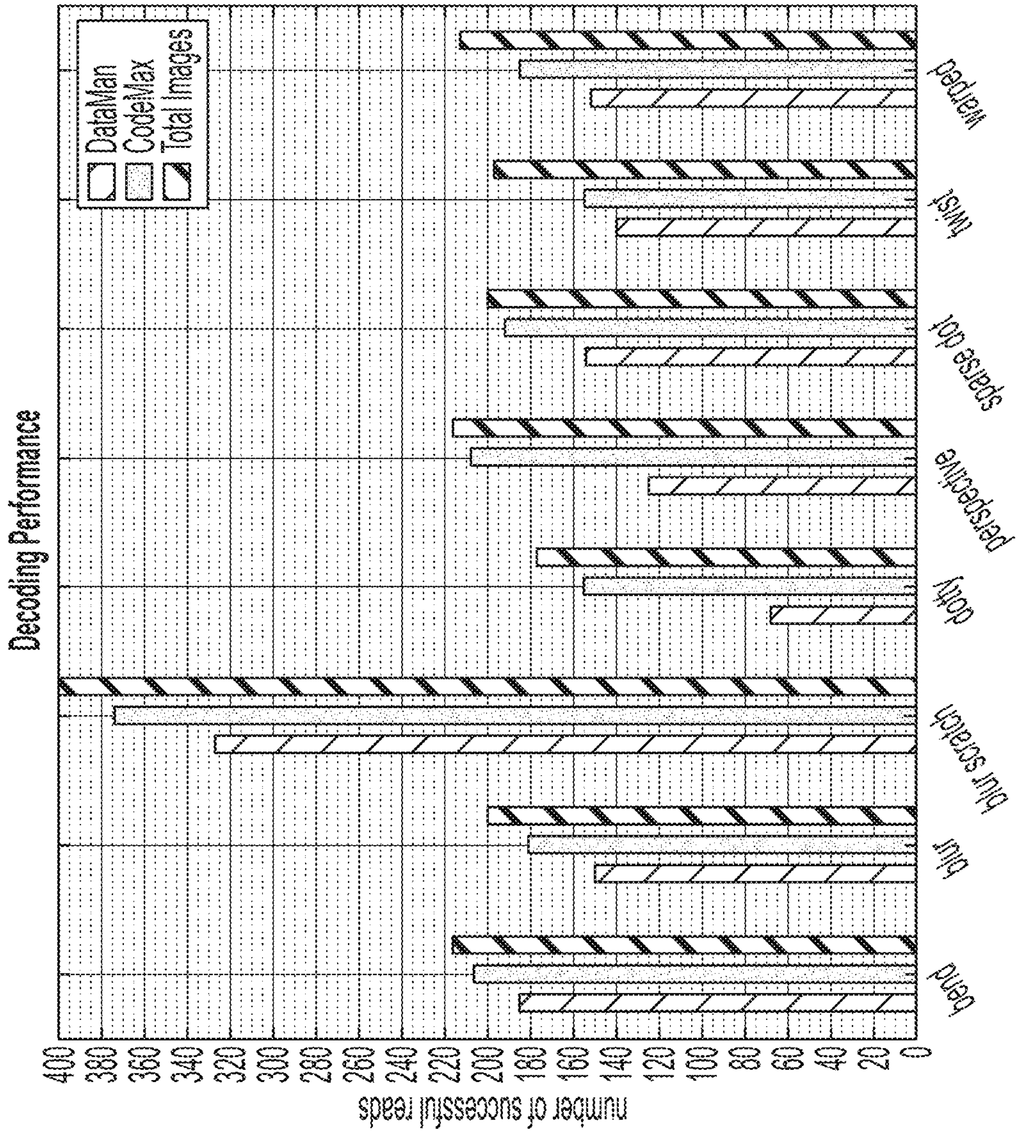
FIG. 12B is a chart illustrating the rate of decoding exemplary Data Matrices with the deep learning module of the system of FIG. 3, compared with a conventional system.
Figure 12C:
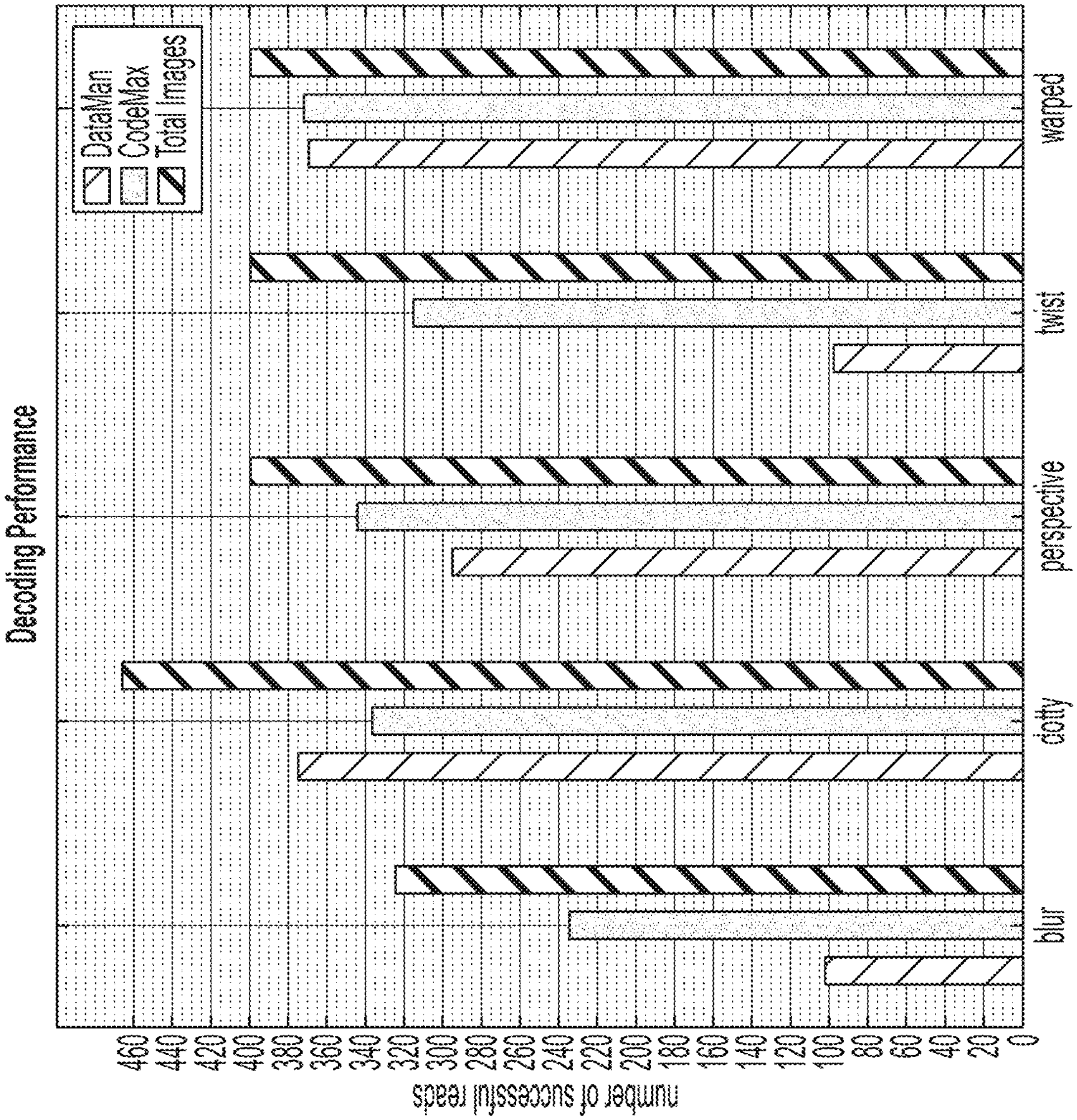
FIG. 12C is a chart illustrating the rate of decoding exemplary QR codes with the deep learning module of the system of FIG. 3, compared with a conventional system.
Figure 12D:
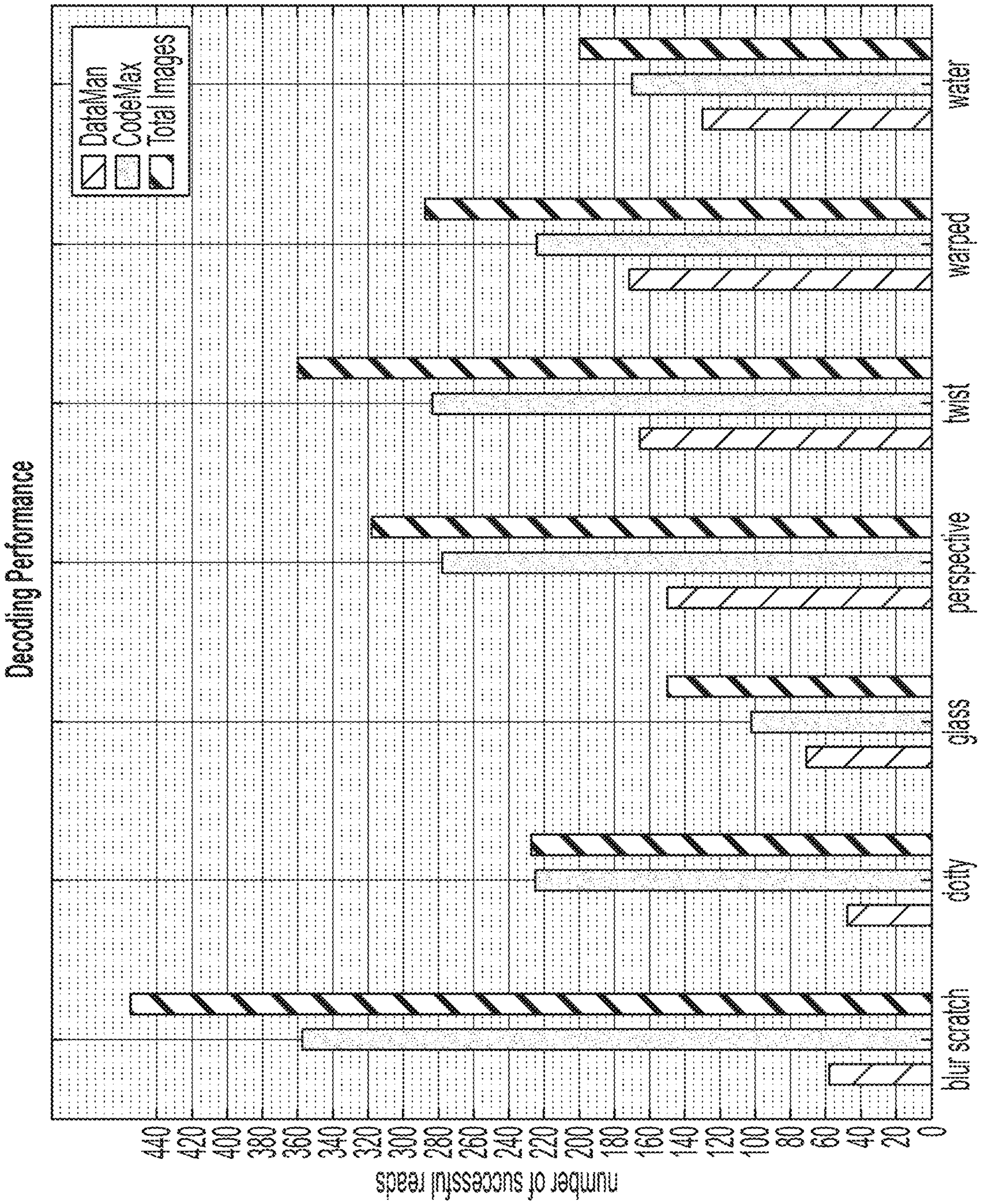
FIG. 12D is a chart illustrating the rate of decoding exemplary Aztec codes with the deep learning module of the system of FIG. 3, compared with a conventional system.

FIG. 12A is a chart illustrating the rate of decoding various types of exemplary codes (shown as "Real Blur EAN13" "Low PPM EAN13" etc.) with deep learning module 302 (shown as "CodeMax DL Enhancer"), compared with conventional systems (shown as "Vision Pro 9.5" and "Vision Pro 10.1"). As illustrated, the deep learning module 302 can read various types of symbols with significantly higher accuracy (12%-85% higher) than the conventional systems. FIGS. 12B-D are charts illustrating the rate of decoding, with the deep learning module 302 (shown as "CodeMax"), exemplary Data Matrices, QR codes, and Aztec codes, respectively, compared with a conventional system (shown as "DataMan"). As illustrated, the deep learning module 302 can read the illustrated types of symbols with various distortions with significantly higher accuracy than the conventional system. It should be appreciated that the deep learning module 302 can relieve requirements on hardware such as optical and imaging devices.

Figure 13:
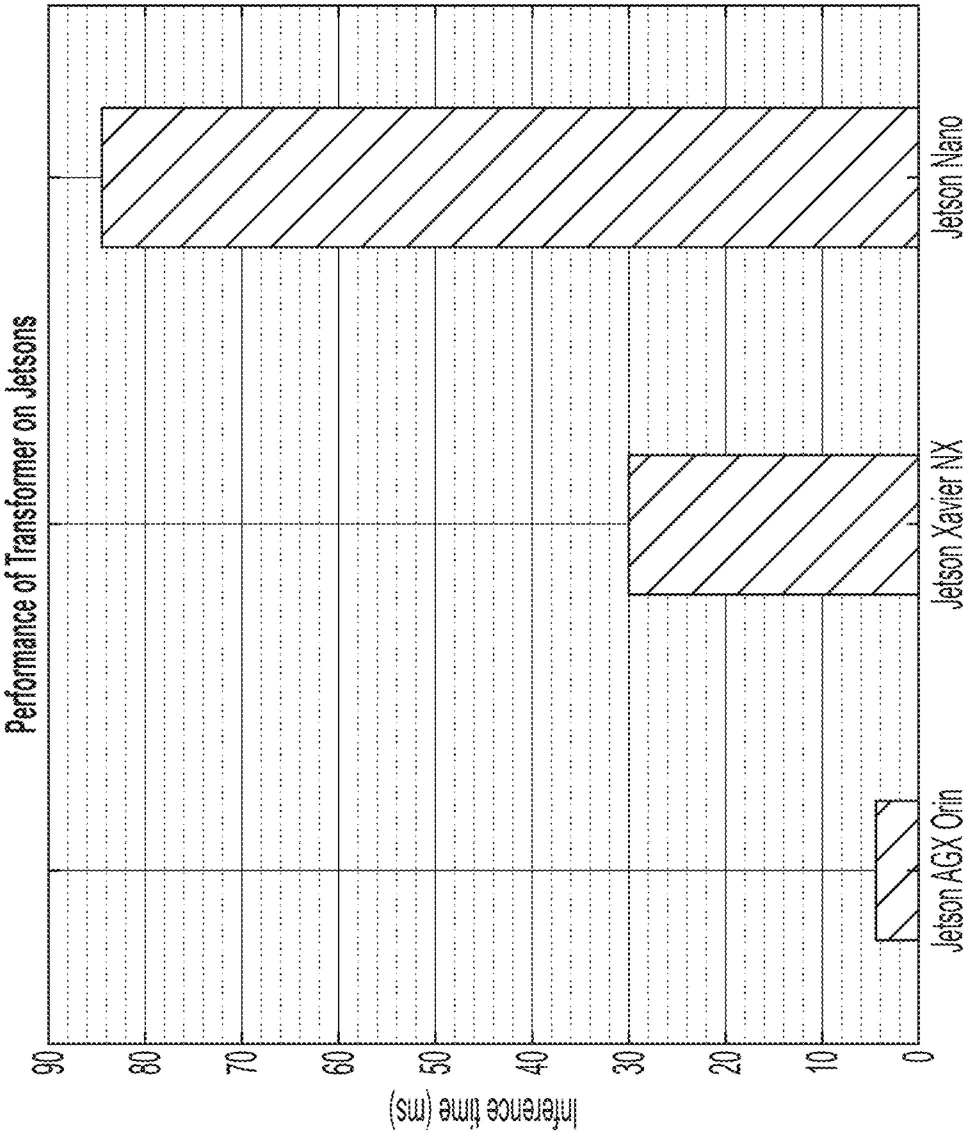
FIG. 13 is a chart illustrating decoding latencies of the deep learning module of the system of FIG. 3, with three exemplary processors.

FIG. 13 is a chart illustrating the decoding latency with the deep learning module 302, with three exemplary processors. As illustrated, the deep learning module 302 has a latency of 4.4 ms with Jetson AGX Orin, 30.0 ms with Jetson Xavier NX, and 84.3 ms with Jetson Nano. This illustrates that the deep learning module 302 can provide faster decoding results than conventional systems and can self-improve with the advancement of processors.

Various aspects are described in this disclosure, which include, but are not limited to, the following aspects:

1. A method for processing symbols, the method comprising accessing an image of a symbol comprising embedded information; inputting the image of the symbol into a deep learning module; and generating, with the deep learning module, predicted embedded information based on the image of the symbol.
2. The method of aspect 1, comprising generating the embedded information based on the predicted embedded information.
3. The method of aspect 2, wherein generating the embedded information comprises determining errors in the predicted embedded information.
4. The method of aspect 3, wherein generating the embedded information comprises correcting any determined errors in the predicted embedded information.
5. The method of aspect 1, wherein the predicted embedded information comprises a plurality of codewords or intermediate digital representations of the plurality of codewords.
6. The method of aspect 5, wherein the intermediate digital representations of the plurality of codewords comprise a binary module value sequence or byte sequence.
7. The method of aspect 5, generating the embedded information comprises determining errors in the plurality of codewords.
8. The method of aspect 5, generating the embedded information comprises correcting any determined errors in the plurality of codewords.
9. The method of aspect 1, wherein the embedded information comprises data and/or an image.
10. The method of aspect 1, wherein the symbol is a data matrix, a QR code, an Aztec code, or a linear barcode.
11. The method of aspect 1, comprising generating a candidate barcode region in the image of the symbol; and cropping the candidate barcode region from the image of the symbol.
12. The method of aspect 11, wherein generating, with the deep learning module, the predicted embedded information comprises determining whether the candidate barcode region is a barcode region or a non-barcode region; and if it is determined that the candidate barcode region is a barcode region, determining a type and/or symbology of a barcode in the barcode region.
13. The method of aspect 11 or aspect 12, wherein generating, with the deep learning module, the predicted embedded information comprises dividing the cropped image into a plurality of patches; and extracting the predicted embedded information from the plurality of patches.
14. The method of aspect 11 or aspect 13, wherein the predicted embedded information comprises a plurality of feature vectors.
15. The method of aspect 14, wherein each of the plurality of feature vectors corresponds to a codeword or an intermediate digital representation of a codeword.
16. The method of aspect 13, wherein generating, with the deep learning module, the predicted embedded information comprises converting each of the plurality of patches into a one-dimensional (1D) vector, and adding position information to the converted 1D vectors; and extracting the predicted embedded information is based on the converted 1D vectors and added position information.
17. The method of aspect 16, wherein generating, with the deep learning module, the predicted embedded information comprises adding a 1D vector to the converted 1D vectors; and generating a vector indicating a start of the predicted embedded information based on the added 1D vector.
18. The method of aspect 16, wherein generating, with the deep learning module, the predicted embedded information comprises determining, with a first multi-head self-attention layer (MSA), relationships between the converted 1D vectors.
19. The method of aspect 18, wherein generating, with the deep learning module, the predicted embedded information comprises extracting, with a first multilayer perceptron (MLP), a first plurality of feature vectors based on the relationships between the converted 1D vectors.
20. The method of aspect 16, wherein generating, with the deep learning module, the predicted embedded information comprises extracting, with a first multilayer perceptron (MLP), a first plurality of feature vectors based on the converted 1D vectors.
21. The method of aspect 18, wherein generating, with the deep learning module, the predicted embedded information comprises determining, with a second multi-head self-attention layer (MSA), relationships between the converted 1D vectors based on the relationships between the converted 1D vectors determined by the first MSA.

22. The method of aspect 19 or aspect 20, wherein generating, with the deep learning module, the predicted embedded information comprises extracting, with a second multilayer perceptron (MLP), a second plurality of feature vectors based on the first plurality of feature vectors.
23. The method of aspect 19 or aspect 20, wherein generating, with the deep learning module, the predicted embedded information comprises determining, with a second multi-head self-attention layer (MSA), relationships between the first plurality of feature vectors.
24. The method of aspect 23, wherein generating, with the deep learning module, the predicted embedded information comprises extracting, with a second multilayer perceptron (MLP), a second plurality of feature vectors based on the relationships between the first plurality of feature vectors.
25. The method of any of aspects 1-24, wherein the deep learning module is trained with a plurality of synthesized images so as to reduce image-specific inductive bias.
26. The method of any of aspects 18-24, wherein the deep learning module comprises a plurality of transformer blocks.
27. A system comprising at least one processor configured to perform one or more operations in any of aspects 1-26.
28. A non-transitory computer readable medium comprising program instructions that, when executed, cause at least one processor to perform one or more operations in any of aspects 1-26.

Having thus described several aspects of several embodiments of a machine vision system and method of operating the machine vision system, it is to be appreciated that various alterations, modifications, and improvements will readily occur to those skilled in the art. Such alterations, modifications, and improvements are intended to be part of this disclosure, and are intended to be within the spirit and scope of the invention. While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

Further, though some advantages of the present disclosure may be indicated, it should be appreciated that not every embodiment of the disclosure will include every described advantage. Some embodiments may not implement any features described as advantageous. Accordingly, the foregoing description and drawings are by way of example only.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

Also, the technology described may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be understood that the above-described acts of the methods described herein can be executed or performed in any order or sequence not limited to the order and sequence shown and described. Also, some of the above acts of the methods described herein can be executed or performed substantially simultaneously where appropriate or in parallel to reduce latency and processing times.

All definitions, as defined and used, should be understood to control over dictionary definitions, definitions in documents incorporated by reference, and/or ordinary meanings of the defined terms.

The indefinite articles "a" and "an," as used in the specification and in the claims, unless clearly indicated to the contrary, should be understood to mean "at least one."

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of."

"Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method for processing symbols, the method comprising:

accessing an image of a symbol comprising embedded information;

inputting the image of the symbol into a deep learning module;

generating a candidate barcode region in the image of the symbol; and generating, with the deep learning module, predicted embedded information based on the image of the symbol, comprising dividing the candidate barcode region into a plurality of patches, and extracting the predicted embedded information from the plurality of patches.

2. The method of claim 1, comprising:

generating the embedded information based on the predicted embedded information.

3. The method of claim 2, wherein:

generating the embedded information comprises determining errors in the predicted embedded information.

4. The method of claim 3, wherein:

generating the embedded information comprises correcting any determined errors in the predicted embedded information.

5. The method of claim 1, wherein:

the predicted embedded information comprises a plurality of codewords or intermediate digital representations of the plurality of codewords.

6. The method of claim 5, wherein:

generating the embedded information comprises determining errors in the plurality of codewords.

7. The method of claim 5, wherein:

generating the embedded information comprises correcting any determined errors in the plurality of codewords.

8. The method of claim 1, wherein generating, with the deep learning module, the predicted embedded information comprises:

determining whether the candidate barcode region is a barcode region or a non-barcode region; and if it is determined that the candidate barcode region is a barcode region, determining a type and/or symbology of a barcode in the barcode region.

9. The method of claim 1, wherein:

the predicted embedded information comprises a plurality of feature vectors.

10. The method of claim 9, wherein:

each of the plurality of feature vectors corresponds to a codeword or an intermediate digital representation of a codeword.

11. The method of claim 1, wherein:

generating, with the deep learning module, the predicted embedded information comprises:

converting each of the plurality of patches into a one-dimensional (1D) vector, and adding position information to the converted 1D vectors; and extracting the predicted embedded information is based on the converted 1D vectors and added position information.

12. The method of claim 11, wherein generating, with the deep learning module, the predicted embedded information comprises:

adding a 1D vector to the converted 1D vectors; and generating a vector indicating a start of the predicted embedded information based on the added 1D vector.

13. The method of claim 11, wherein generating, with the deep learning module, the predicted embedded information comprises:

determining, with a first multi-head self-attention layer (MSA), relationships between the converted 1D vectors.

14. The method of claim 13, wherein generating, with the deep learning module, the predicted embedded information comprises:

extracting, with a first multilayer perceptron (MLP), a first plurality of feature vectors based on the relationships between the converted 1D vectors.

15. The method of claim 11, wherein generating, with the deep learning module, the predicted embedded information comprises:

extracting, with a first multilayer perceptron (MLP), a first plurality of feature vectors based on the converted 1D vectors.

16. The method of claim 13, wherein generating, with the deep learning module, the predicted embedded information comprises:

determining, with a second multi-head self-attention layer (MSA), relationships between the converted 1D vectors based on the relationships between the converted 1D vectors determined by the first MSA.

17. A system comprising:

an imaging device configured to capture images; and at least one processor in communication with the imaging device and configured to execute computer executable instructions, wherein the computer executable instructions comprise instructions for:

accessing an image of a symbol that is captured using the imaging device, the image comprising embedded information;

inputting the image of the symbol into a deep learning module;

generating a candidate barcode region in the image of the symbol; and generating, with the deep learning module, predicted embedded information based on the image of the symbol, comprising dividing the candidate barcode region into a plurality of patches, and extracting the predicted embedded information from the plurality of patches.

18. A non-transitory computer readable medium comprising program instructions that, when executed, cause at least one processor to:

access an image of a symbol comprising embedded information;

input the image of the symbol into a deep learning module;

generate a candidate barcode region in the image of the symbol; and generate, with the deep learning module, predicted embedded information based on the image of the symbol, comprising dividing the candidate barcode region into a plurality of patches, and extracting the predicted embedded information from the plurality of patches.

19. The system of claim 17, wherein the computer executable instructions comprise instructions for:

generating the embedded information based on the predicted embedded information.

20. The system of claim 17, wherein:

the predicted embedded information comprises a plurality of codewords or intermediate digital representations of the plurality of codewords.

* * * * *